US011782886B2

(12) United States Patent
Manjunath et al.

(10) Patent No.: US 11,782,886 B2
(45) Date of Patent: Oct. 10, 2023

(54) INCREMENTAL VIRTUAL MACHINE METADATA EXTRACTION

(71) Applicant: Cohesity, Inc., San Jose, CA (US)

(72) Inventors: Chinmaya Manjunath, San Jose, CA (US); Anirvan Duttagupta, San Jose, CA (US); Anubhav Gupta, Sunnyvale, CA (US); Sidharth Mishra, Santa Clara, CA (US); Zhihuan Qiu, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 87 days.

(21) Appl. No.: 17/489,536

(22) Filed: Sep. 29, 2021

(65) Prior Publication Data

US 2022/0138163 A1   May 5, 2022

Related U.S. Application Data

(63) Continuation of application No. 16/705,078, filed on Dec. 5, 2019, now Pat. No. 11,176,102, which is a continuation of application No. 16/110,314, filed on Aug. 23, 2018, now Pat. No. 10,534,759.

(51) Int. Cl.
*G06F 16/188* (2019.01)
*G06F 16/11* (2019.01)

(52) U.S. Cl.
CPC .......... *G06F 16/188* (2019.01); *G06F 16/128* (2019.01)

(58) Field of Classification Search
None
See application file for complete search history.

(56) References Cited

U.S. PATENT DOCUMENTS

| 7,421,648 | B1 | 9/2008 | Davis |
| 7,437,764 | B1 | 10/2008 | Sobel |
| 8,020,037 | B1 | 9/2011 | Schwartz |

(Continued)

OTHER PUBLICATIONS

Actifio. "Getting Started with Actifio VDP." Sep. 23, 2020. https://web.archive.org/web/20200923181125/https://docs.actifio.com/10.0/PDFs/Introducing.pdf (Year: 2020).

(Continued)

*Primary Examiner* — Christopher J Raab
(74) *Attorney, Agent, or Firm* — Van Pelt, Yi & James LLP

(57) ABSTRACT

A virtual machine container file is analyzed to determine which portion of the virtual machine container file corresponds to a virtual machine file system metadata of the virtual machine container file. One or more differences between a first version of a virtual machine container file and a second version of the virtual machine container file are determined at least in part by traversing a snapshot structure associated with the virtual machine container file. The determined one or more differences that corresponds to the virtual machine file system metadata portion of the virtual machine container file are identified based at least in part on the analysis of the virtual machine container file. The identified one or more differences corresponding to the virtual machine file system metadata portion of the virtual machine file are utilized to identify one or more changes from the content files included in the first version of the virtual machine container file to content files included in the second version of the virtual machine container file.

20 Claims, 12 Drawing Sheets

(56) References Cited

U.S. PATENT DOCUMENTS

| | | | |
|---|---|---|---|
| 8,086,585 B1* | 12/2011 | Brashers | G06F 16/137 707/705 |
| 8,112,661 B1 | 2/2012 | La France | |
| 8,190,583 B1 | 5/2012 | Shekar | |
| 8,312,471 B2 | 11/2012 | Davis | |
| 8,364,648 B1 | 1/2013 | Sim-Tang | |
| 8,607,342 B1 | 12/2013 | Liao | |
| 9,268,689 B1* | 2/2016 | Chen | G06F 21/53 |
| 9,304,864 B1 | 4/2016 | Bushman | |
| 9,311,190 B1 | 4/2016 | Bushman | |
| 9,361,185 B1 | 6/2016 | Bushman | |
| 9,471,441 B1 | 10/2016 | Lyadvinsky | |
| 9,489,230 B1 | 11/2016 | Patwardhan | |
| 9,594,514 B1* | 3/2017 | Bono | G06F 3/0679 |
| 9,621,428 B1 | 4/2017 | Lev | |
| 9,983,812 B1 | 5/2018 | Don | |
| 10,037,223 B2 | 7/2018 | Park | |
| 10,089,148 B1 | 10/2018 | Blitzer | |
| 10,162,528 B2 | 12/2018 | Sancheti | |
| 10,169,077 B1 | 1/2019 | Sigl, Sr. | |
| 10,175,896 B2 | 1/2019 | Battaje | |
| 10,275,321 B1 | 4/2019 | Bajaj | |
| 10,496,497 B1 | 12/2019 | Yadav | |
| 10,503,612 B1 | 12/2019 | Wang | |
| 10,545,776 B1 | 1/2020 | Kowalski | |
| 10,877,928 B2 | 12/2020 | Nagrale | |
| 10,896,097 B1 | 1/2021 | Purcell | |
| 11,036,594 B1 | 6/2021 | Shats | |
| 11,176,154 B1 | 11/2021 | Dasgupta | |
| 2003/0033344 A1 | 2/2003 | Abbott | |
| 2004/0250033 A1 | 12/2004 | Prahlad | |
| 2006/0069861 A1 | 3/2006 | Amano | |
| 2006/0182255 A1 | 8/2006 | Luck | |
| 2007/0153675 A1 | 7/2007 | Baglin | |
| 2008/0208926 A1 | 8/2008 | Smoot | |
| 2009/0089657 A1 | 4/2009 | Davis | |
| 2009/0171707 A1 | 7/2009 | Bobak | |
| 2009/0313503 A1 | 12/2009 | Atluri | |
| 2010/0031170 A1 | 2/2010 | Carullo | |
| 2010/0070725 A1 | 3/2010 | Prahlad | |
| 2010/0106933 A1 | 4/2010 | Kamila | |
| 2010/0122248 A1 | 5/2010 | Robinson | |
| 2011/0022879 A1 | 1/2011 | Chavda | |
| 2011/0106776 A1 | 5/2011 | Vik | |
| 2011/0107246 A1 | 5/2011 | Vik | |
| 2012/0203742 A1 | 8/2012 | Goodman | |
| 2013/0006943 A1 | 1/2013 | Chavda | |
| 2013/0179481 A1* | 7/2013 | Halevy | G06F 16/134 707/827 |
| 2013/0191347 A1 | 7/2013 | Bensinger | |
| 2013/0219135 A1 | 8/2013 | Knowles | |
| 2013/0227558 A1 | 8/2013 | Du | |
| 2013/0232480 A1 | 9/2013 | Winterfeldt | |
| 2013/0232497 A1 | 9/2013 | Jalagam | |
| 2013/0254402 A1 | 9/2013 | Vibhor | |
| 2013/0322335 A1 | 12/2013 | Smith | |
| 2014/0040206 A1 | 2/2014 | Ramakrishnan | |
| 2014/0052692 A1 | 2/2014 | Zhang | |
| 2014/0059306 A1 | 2/2014 | Bender | |
| 2014/0165060 A1 | 6/2014 | Muller | |
| 2014/0297588 A1 | 10/2014 | Babashetty | |
| 2014/0359229 A1 | 12/2014 | Cota-Robles | |
| 2014/0372553 A1* | 12/2014 | Blackburn | H04L 67/34 709/217 |
| 2015/0193487 A1 | 7/2015 | Demidov | |
| 2015/0254150 A1 | 9/2015 | Gordon | |
| 2015/0278046 A1 | 10/2015 | Zellermayer | |
| 2015/0347242 A1 | 12/2015 | Martos | |
| 2015/0363270 A1 | 12/2015 | Hammer | |
| 2015/0370502 A1 | 12/2015 | Aron | |
| 2015/0378765 A1 | 12/2015 | Singh | |
| 2016/0004450 A1 | 1/2016 | Lakshman | |
| 2016/0034356 A1 | 2/2016 | Aron | |
| 2016/0048408 A1 | 2/2016 | Madhu | |
| 2016/0070714 A1* | 3/2016 | D'Sa | G06F 16/1748 707/692 |
| 2016/0085636 A1 | 3/2016 | Dornemann | |
| 2016/0125059 A1 | 5/2016 | Jain | |
| 2016/0162378 A1 | 6/2016 | Garlapati | |
| 2016/0188898 A1 | 6/2016 | Karinta | |
| 2016/0203060 A1 | 7/2016 | Singh | |
| 2016/0232061 A1 | 8/2016 | Gaschler | |
| 2016/0321339 A1 | 11/2016 | Tekade | |
| 2016/0357640 A1 | 12/2016 | Bushman | |
| 2016/0357641 A1 | 12/2016 | Bushman | |
| 2016/0357769 A1 | 12/2016 | Bushman | |
| 2017/0031613 A1* | 2/2017 | Lee | G06F 3/065 |
| 2017/0031622 A1 | 2/2017 | Nagarajan | |
| 2017/0060710 A1 | 3/2017 | Ramani | |
| 2017/0060884 A1 | 3/2017 | Goodman | |
| 2017/0123935 A1* | 5/2017 | Pandit | G06F 16/2219 |
| 2017/0168903 A1 | 6/2017 | Dornemann | |
| 2017/0185491 A1 | 6/2017 | Hajare | |
| 2017/0185729 A1* | 6/2017 | Boray | G16H 50/20 |
| 2017/0193116 A1 | 7/2017 | Wong | |
| 2017/0206212 A1* | 7/2017 | Srivilliputtur Mannarswamy | G06F 3/067 |
| 2017/0212680 A1 | 7/2017 | Waghulde | |
| 2017/0337109 A1 | 11/2017 | Ramu | |
| 2018/0004437 A1 | 1/2018 | Battaje | |
| 2018/0004764 A1* | 1/2018 | Sudarsanam | G06F 16/178 |
| 2018/0060106 A1 | 3/2018 | Madtha | |
| 2018/0060187 A1 | 3/2018 | Chavda | |
| 2018/0081766 A1 | 3/2018 | Ghuge | |
| 2018/0081902 A1 | 3/2018 | Mckenzie | |
| 2018/0088973 A1* | 3/2018 | Subhraveti | G06F 8/60 |
| 2018/0095846 A1 | 4/2018 | Sanakkayala | |
| 2018/0113625 A1 | 4/2018 | Sancheti | |
| 2018/0196820 A1 | 7/2018 | Kremer | |
| 2018/0212896 A1 | 7/2018 | Chang | |
| 2018/0253414 A1 | 9/2018 | Hailpern | |
| 2018/0293374 A1 | 10/2018 | Chen | |
| 2018/0316577 A1 | 11/2018 | Freeman | |
| 2018/0329637 A1 | 11/2018 | Battaje | |
| 2019/0065277 A1 | 2/2019 | Raikov | |
| 2019/0073276 A1 | 3/2019 | Yuen | |
| 2019/0108266 A1 | 4/2019 | Manvar | |
| 2019/0129799 A1 | 5/2019 | Kumarasamy | |
| 2019/0132203 A1 | 5/2019 | Wince | |
| 2019/0197020 A1 | 6/2019 | Yap | |
| 2019/0215358 A1 | 7/2019 | Kobayashi | |
| 2019/0220198 A1 | 7/2019 | Kashi Visvanathan | |
| 2019/0228097 A1 | 7/2019 | Kassa | |
| 2019/0278662 A1 | 9/2019 | Nagrale | |
| 2019/0278663 A1 | 9/2019 | Mehta | |
| 2020/0026538 A1 | 1/2020 | Cui | |
| 2020/0034254 A1 | 1/2020 | Natanzon | |
| 2020/0057567 A1 | 2/2020 | Hutcheson | |
| 2020/0057669 A1 | 2/2020 | Hutcheson | |
| 2020/0110755 A1 | 4/2020 | Waldman | |
| 2020/0142865 A1* | 5/2020 | Manjunath | G06F 16/188 |
| 2020/0159625 A1 | 5/2020 | Hutcheson | |
| 2020/0167238 A1 | 5/2020 | Killamsetti | |
| 2020/0183794 A1 | 6/2020 | Dwarampudi | |
| 2020/0233571 A1 | 7/2020 | Yuravlivker | |
| 2020/0278274 A1 | 9/2020 | Shetty | |
| 2020/0285449 A1 | 9/2020 | Mcintosh | |
| 2021/0056203 A1 | 2/2021 | Qiao | |
| 2021/0081087 A1 | 3/2021 | Wayne | |
| 2021/0103556 A1 | 4/2021 | Nagrale | |
| 2021/0232579 A1 | 7/2021 | Schechter | |
| 2021/0318851 A1 | 10/2021 | Sahu | |

OTHER PUBLICATIONS

C. Grace. "Site Recovery Manager Technical Overview." Dec. 1, 2020. https://web.archive.org/web/20201201181602/https://core.vmware.com/resource/site-recovery-manager-technical-overview (Year: 2020).

Cloud Endure. "Cloud Endure Documentation." Dec. 1, 2020. https://web.archive.org/web/20201201022045/https://docs.cloudendure.com/CloudEndure%20Documentation.htm (Year: 2020).

(56) References Cited

OTHER PUBLICATIONS

M. Chuang. "Announcing VMware Cloud Disaster Recovery." Sep. 29, 2020. https://web.archive.org/web/20201102133037/https://blogs.vmware.com/virtualblocks/2020/09/29/announcing-vmware-cloud-disaster-recovery/ (Year: 2020).

M. McLaughlin. "VMware Cloud Disaster Recovery is Now Available." Oct. 20, 2020. https://web.archive.org/web/20201103021801/https://blogs.vmware.com/virtualblocks/2020/10/20/vmware-cloud-disaster-recovery-is-now-available/ (Year: 2020).

Red Hat. "Red Hat Virtualization 4.3 Disaster Recovery Guide." Jul. 17, 2019. https://web.archive.org/web/20190717013417/https://access.redhat.com/documentation/en-us/red_hat_virtualization/4.3/html/disaster_recovery_guide/index (Year: 2019).

Red Hat. "Red Hat Virtualization 4.3 Product Guide." Jul. 17, 2019. https://web.archive.org/web/20190717013254/https://access.redhat.com/documentation/en-us/red_hat_virtualization/4.3/html/product_guide/index (Year: 2019).

VMware. "Site Recovery Manager Administration." May 31, 2019. https://docs.vmware.com/en/Site-Recovery-Manager/8.5/srm-admin-8-5.pdf (Year: 2019).

VMware. "Site Recovery Manager Evaluation Guide." Oct. 19, 2020. https://web.archive.org/web/20201019155135/https://core.vmware.com/resource/site-recovery-manager-evaluation-guide (Year: 2020).

Zerto. "Zerto Disaster Recovery Guide." Sep. 2016. https://www.zerto.com/wp-content/uploads/2016/09/Zerto-Disaster-Recovery-Guide_CIO_eBook.pdf (Year: 2016).

"Backup Solution Guide"—Synology https://download.synology.com/download/www-res/brochure/backup_solution_guide_en-global.pdf (Year: 2019).

"Recovering File from an Amazon EBS Volume Backup"—Josh Rad, AWS, Feb. 1, 2019 https://aws.amazon.com/blogs/compute/recovering-files-from-an-amazon-ebs-volume-backup/ (Year: 2019).

Cohesity, Cohesity Data Protection White Paper, 2016, Cohesity, pp. 1-12 (Year: 2016).

Gaetan Castlelein, Cohesity SnapFS and SnapTree, Aug. 9, 2017, Cohesity, pp. 1-4 (Year: 2017).

* cited by examiner

INCREMENTAL VIRTUAL MACHINE METADATA EXTRACTION

CROSS REFERENCE TO OTHER APPLICATIONS

This application is a continuation of U.S. patent application Ser. No. 16/705,078, entitled INCREMENTAL VIRTUAL MACHINE METADATA EXTRACTION filed Dec. 5, 2019, which is a continuation of U.S. patent application Ser. No. 16/110,314, now U.S. Pat. No. 10,534,759, entitled INCREMENTAL VIRTUAL MACHINE METADATA EXTRACTION filed Aug. 23, 2018, each of which is incorporated herein by reference for all purposes.

BACKGROUND OF THE INVENTION

A virtual machine that is comprised of a plurality of content files may be ingested and backed up to a storage system. The storage system may create an index of the content files. The virtual machine may be backed up a plurality of times to the storage system and the storage system is configured to store the different versions of the virtual machine. The different versions of the virtual machine may include different versions of the content files. To determine which files have changed between the virtual machine versions, conventional systems read the entire contents of a first and second version of a virtual machine, and determine the differences between the virtual machine versions. This is a time consuming and resource intensive process because a virtual machine may be comprised of a large amount of data (e.g., 100 TB).

Other systems read through the metadata associated with a virtual machine. The metadata associated with a content file of the virtual machine may include a timestamp. The timestamp may be compared with timestamps associated with virtual machine versions to determine when the content file was modified. The metadata associated with a virtual machine volume may comprise approximately five percent of the virtual machine volume. For large virtual machine volumes, going through the metadata to determine which content files have changed based on a timestamp associated with a content file is still a time consuming and resource intensive process.

BRIEF DESCRIPTION OF THE DRAWINGS

Various embodiments of the invention are disclosed in the following detailed description and the accompanying drawings.

DETAILED DESCRIPTION

Figure 1:
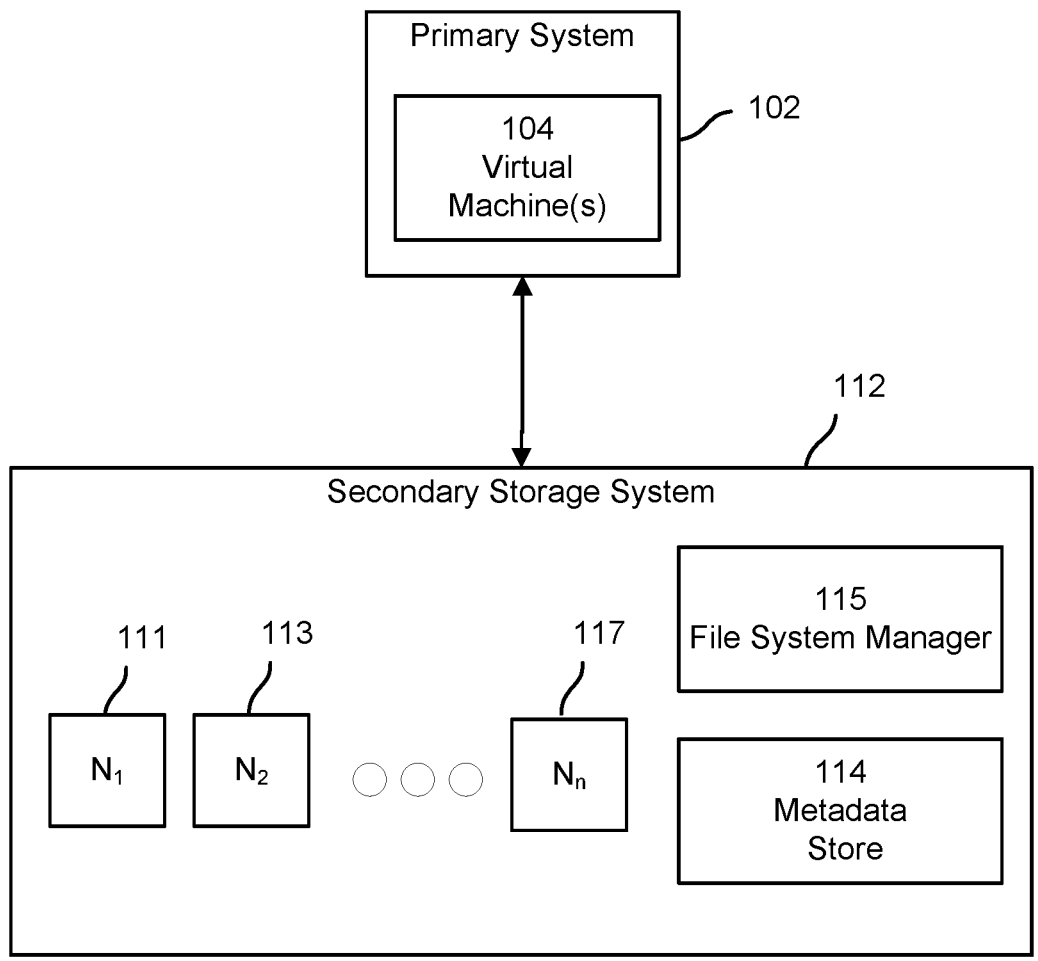
FIG. 1 is a block diagram illustrating an embodiment of a system for backing up virtual machines.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to identify one or more virtual machine content files that have changed or have been added since a previous virtual machine backup is disclosed. The disclosed technique reduces the amount of time and resources needed to identify the one or more virtual machine content files.

A primary system is comprised of file system data. The file system data includes a plurality of files and metadata associated with the plurality of files. The primary system may host one or more virtual machines. A virtual machine may be stored as one or more container files (e.g., virtual machine image file, virtual machine disk file, etc.) of the plurality of files of the file system data. The virtual machine container file includes a plurality of virtual machine content files of the virtual machine and metadata associated with the plurality of virtual machine content files, i.e., virtual machine file system metadata. The primary system may perform a backup snapshot of the file system data including the one or more virtual machine container files according to a backup policy and send the backup snapshot to a secondary storage system. A backup snapshot represents the state of the primary system at a particular point in time (e.g., the state of the file system data). The backup snapshot policy may require a full backup snapshot or an incremental backup snapshot to be performed. A full backup snapshot includes the entire state of the primary system at a particular point in time. An incremental backup snapshot includes the state of the primary system that has changed since a last backup snapshot.

A secondary storage system may ingest and store the backup snapshot across a plurality of storage nodes of the secondary storage system. A file system manager of the secondary storage system may organize the file system data of the backup snapshot using a tree data structure. An example of the tree data structure is a snapshot tree (e.g., Cohesity Snaptree), which may be based on a B+ tree structure (or other type of tree structure in other embodiments). The tree data structure provides a view of the file system data corresponding to a backup snapshot. The view of the file system data corresponding to the backup snapshot is comprised of a snapshot tree and a plurality of file metadata trees (e.g., Blob structures). A file metadata tree may correspond to one of the files included in the backup snapshot. The file metadata tree is a snapshot structure that stores the metadata associated with the file. For example, a file metadata tree may correspond to a virtual machine container file (e.g., virtual machine image file, virtual machine disk file, etc.). Thus, the file metadata tree may store the metadata associated with a virtual machine container file. Regardless if the view of the file system data corresponds to a full backup snapshot or an incremental backup snapshot, the view of the file system data corresponding to the backup snapshot provides a fully hydrated backup snapshot that provides a complete view of the primary system at a moment in time corresponding to when the backup snapshot was performed. The view of file system data may allow any content file that was stored on the primary system at the time the corresponding backup snapshot was performed, to be retrieved, restored, or replicated. The view of file system data may also allow any content file that was included in a virtual machine container file and was stored on the primary system at the time the corresponding backup snapshot was performed, to be retrieved, restored, or replicated.

A snapshot tree includes a root node, one or more levels of one or more intermediate nodes associated with the root node, and one or more leaf nodes associated with an intermediate node of the lowest intermediate level. The root node of a snapshot tree includes one or more pointers to one or more intermediate nodes. The root node corresponds to a particular backup snapshot of file system data. Each intermediate node includes one or more pointers to other nodes (e.g., a lower intermediate node or a leaf node).

Metadata associated with a file that is less than or equal to a limit size (e.g., 256 kB) may be stored in a leaf node of the snapshot tree. For example, a leaf node may store an inode. Metadata associated with a file that is greater than or equal to the limit size has an associated file metadata tree (e.g., Blob structure). The file metadata tree is a snapshot structure and is configured to store the metadata associated with a file. The file may correspond to a virtual machine container file. Thus, a file metadata tree may be used to represent an entire virtual machine. The file metadata tree is stored in storage separately from the file. The file metadata tree includes a root node, one or more levels of one or more intermediate nodes associated with the root node, and one or more leaf nodes associated with an intermediate node of the lowest intermediate level. A file metadata tree is similar to a snapshot tree, but a leaf node of a file metadata tree includes an identifier of a data brick storing one or more data chunks of the file or a pointer to the data brick storing one or more data chunks of the file. For example, a leaf node of a file metadata tree may include a pointer to or an identifier of a data brick storing one or more data chunks of a virtual machine container file. The location of the data brick may be identified using a table stored in a metadata store that matches brick numbers to a physical storage location or the location of the data brick may be identified based on the pointer to the data brick.

A virtual machine container file is comprised of a plurality of virtual machine content files and metadata associated with the plurality of virtual machine content files. The virtual machine container file may be analyzed to determine which portions of the virtual machine container file correspond to the plurality of virtual machine content files and which portions of the virtual machine container file correspond to the metadata associated with the plurality of virtual machine content files. The portions of the virtual machine container file corresponding to the metadata associated with the plurality of virtual machine content files may be further analyzed to determine which portions of the virtual machine container file corresponding to the metadata associated with the plurality of virtual machine content files correspond to which virtual machine content file.

For example, the virtual machine container file may be analyzed to determine a location of a file table. The virtual machine container file may store a file table that stores metadata associated with the plurality of virtual machine content files. A first entry of the file table may correspond to the metadata associated with a first virtual machine content file, a second entry of the file table may correspond to the metadata associated with a second virtual machine content file, and an nth entry of the file table may correspond to the metadata associated with an nth virtual machine content file. Each entry has an associated file offset range within the virtual machine container file. For example, a virtual machine container file may be 100 TB and store a plurality of files. The virtual machine container file may store a boot sector in a file offset range of 0-1 kB region of the virtual machine container file and the file table in a 1 kB-100 MB region of the virtual machine container file. The first entry of the file table may be stored in the file offset range of 1 kB-1.1 kB, the second entry of the file table may be stored in the file offset range of 1.1 kB-1.2 kB, and an nth entry of the file table may be stored in the file offset range of 99.9 MB-100 MB.

A snapshot tree may be traversed to determine one or more nodes not shared by two virtual machine versions. A file metadata tree may correspond to a version of a virtual machine container file. The snapshot tree may include a first leaf node that includes a pointer to a file metadata tree corresponding to the first version of the virtual machine container file and a second leaf node that includes a pointer to a file metadata tree corresponding to the second version of the virtual machine container file. The snapshot tree may be traversed from a root node of the snapshot tree to the first leaf node and the second leaf node. The file metadata tree corresponding to the first version of the virtual machine container file and the file metadata tree corresponding to the second version of the virtual machine container file may be traversed to determine one or more leaf nodes that are not shared by the file metadata trees. In some embodiments, the file metadata tree corresponding to the second version of the virtual machine container file is traversed without traversing the file metadata tree corresponding to the first version of the virtual machine container file to determine one or more leaf nodes that are not shared by the file metadata trees. The nodes that are not shared by the two versions may be determined based on a view identifier associated with a node. For example, a node that has a view identifier associated with the second version of the virtual machine container file is not included in the first version of the virtual machine container file. A leaf node of a file metadata tree may include an identifier of or a pointer to a brick storing one or more data chunks associated with the virtual machine container file. The data brick storing one or more data chunks associated with the virtual machine container file may correspond to a virtual machine content file or metadata associated with a virtual machine content file. The data brick corresponds to a particular file offset within the virtual machine container file.

It is determined whether the file offset of the data brick corresponds to a portion of the virtual machine container file that stores a virtual machine content file or a portion of the virtual machine container file that stores metadata associated with the virtual machine content file. In the event the data brick corresponds to a portion of the virtual machine container file that stores the virtual machine content file, the data brick is ignored and the next data brick is examined. In the event the data brick corresponds to a portion of the virtual machine container file that stores metadata associated with the virtual machine content file, the file offset of the data brick is compared to the file offsets included in the file table. The file offset may be used to determine which file has changed between virtual machine container file versions. For example, a data brick with a file offset range of 1 kB-1.1 kB indicates that the metadata associated with a first virtual machine content file has been modified. As a result, the first virtual machine content file may be determined to have been modified. A data brick with a file offset range of 1.1 kB-1.2 kB indicates that the metadata associated with a second virtual machine content file has been modified. As a result, the second virtual machine content file may be determined to have been modified. A data brick with a file offset range of 99.9 MB-100 MB indicates that the metadata associated with an nth virtual machine content file has been modified. As a result, the nth virtual machine content file may be determined to have been modified.

One or more virtual machine content files that have changed since a previous virtual machine backup may be quickly identified by intersecting the data bricks identified by traversing the snapshot tree with the portion of a master file table corresponding to modified files because the files in the master file table are small (e.g., 1 kB). The amount of time needed to read a file in the master file table pales in comparison to the amount of time needed to read all of the virtual machine metadata. The amount of time needed to read a subset of the master file table is proportional to the number of virtual machine content files that have changed since a last backup. For example, a 100 TB virtual machine container file may have 100 GB of metadata. Each virtual machine content file may have a corresponding metadata file in the master file table that is 1 kB in size. Traversing the snapshot trees may identify 10 files have changed since a last backup. The storage system may read 10 kB in data (10 files, each metadata file is 1 kB) to determine the one or more virtual machine content files that have changed since a pervious virtual machine backup instead of reading the 100 GB of metadata.

The size of metadata associated with a virtual machine content file is much smaller than the size of a virtual machine content file. When a virtual machine content file is modified, the amount of metadata associated with the virtual machine content file that has changed is much smaller than the amount of data associated with the virtual machine content file that has changed. Examining the metadata associated with the virtual machine content file to determine if the virtual machine content file has changed is faster than examining the data associated with the virtual machine content file to determine if the virtual machine content file has changed because large portions of data not shared by two virtual machine container files may correspond to a single virtual machine content file. Examining each aspect of the large portion of data is duplicative because each aspect indicates the single virtual machine content file has been modified. Whereas, a single portion of metadata associated with the single virtual machine container file may have changed and the single portion of metadata indicates that the single virtual machine content file has changed. Examining the metadata associated with a virtual machine content file reduces the amount of time and resources to determine whether the virtual machine content file has changed or has been added since a previous virtual machine backup because the tree data structure enables the portions of metadata associated with the virtual machine content file that have changed to be quickly identified.

The secondary storage system may manage a map that associates a file offset range of metadata associated with a virtual machine content file with its corresponding virtual machine content file. A leaf node of a file metadata tree corresponding to a virtual machine container file may indicate a brick storing one or more data chunks of data associated with the virtual machine container file. The brick has a corresponding file offset within the virtual machine container file and may be used to determine that the brick corresponds to metadata associated with a virtual machine content file. The map may be examined and the file offset corresponding to the brick may compared to the file offset ranges of metadata associated with the plurality of virtual machine content files. In the event the file offset corresponding to the brick is included in a file offset range associated with metadata associated with a virtual machine content file, the virtual machine content file corresponding to the file offset range may be determined to have changed or added between virtual machine versions. For example, a data brick with a file offset of 1.1 kB-1.2 kB corresponds to metadata associated with the first virtual machine content file and indicates that the first virtual machine content file has been modified, a data brick with a file offset of 1.1 kB-1.2 kB corresponds to metadata associated with the second virtual machine content file and indicates that the second virtual machine content file has been modified, and a data brick with a file offset of 99.9 MB-100 MB corresponds to metadata associated with the nth virtual machine content file and indicates that the nth virtual machine content file has been modified.

In other embodiments, for portions of the virtual machine container file that correspond to metadata associated with a virtual machine content file, the metadata associated with a virtual machine content file is read. The metadata may store filename of a virtual machine content file and a timestamp that indicates that the virtual machine content file with which the metadata is associated, has changed. For example, the metadata may store a timestamp that indicates the virtual machine content file was modified after a last backup snapshot.

Determining which virtual machine content files are not shared between virtual machine versions using the techniques disclosed herein has several advantages. First, an index may be created that lists the one or more virtual machine content files associated with a virtual machine version. The amount of time needed to create the index is reduced because the one or more virtual machine content files that have been modified or added since a previous virtual machine version may be quickly identified using the techniques disclosed herein. The index associated with a previous version of the virtual machine may be quickly updated to include the one or more identified virtual machine content files. Second, a version of a virtual machine content file included within a virtual machine version may be determined. This may enable a user to recover a particular version of a virtual machine content file. Third, a virus scan of a virtual machine may be performed a lot faster. Typically, a virus scanner may scan a first version of a virtual machine (e.g., the entire virtual machine container file) to determine whether there is a problem with any of the virtual machine content files included in the first version of the virtual machine container file. A conventional system may also scan a second version of the virtual machine to determine whether there is a problem with any of the virtual machine content files included in the second version virtual machine container file. Instead of scanning the entire contents of the second version of the virtual machine, the one or more virtual machine content files that have been modified or added since the first version of the virtual machine may be scanned. The one or more virtual machine content files may be quickly identified using the techniques disclosed herein. Subsequently, a virus scanner may be applied to the portions of the virtual machine container file corresponding to the one or more identified virtual machine content files. This reduces the amount of time to perform a virus scan of the virtual machine container file. Fourth, the virtual machine container file may be analyzed to determine how much data has changed between virtual machine versions and which portions of the virtual machine container file have changed. This may allow a user of the virtual machine container file to determine which portions of the virtual machine are frequently used and/or critical to the operation of the virtual machine.

FIG. 1 is a block diagram illustrating an embodiment of a system for backing up virtual machines. In the example shown, system 100 includes a primary system 102 and a secondary storage system 112.

Primary system 102 is a computing system that stores file system data. The file system data may be stored across one or more object(s), virtual machine(s), physical entity/entities, file system(s), array backup(s), and/or volume(s) of the primary system 102. Primary system 102 may be comprised of one or more servers, one or more computing devices, one or more storage devices, and/or a combination thereof.

Primary system 102 may include one or more virtual machines 104. A virtual machine may be stored as one or more container files (e.g., virtual machine image file, virtual machine disk file, etc.). The virtual machine container file includes a plurality of virtual machine content files of the virtual machine and metadata associated with the plurality of virtual machine content files.

Primary system 102 may be configured to backup file system data to secondary storage system 112 according to one or more backup policies. The file system data includes the one or more virtual machine container files corresponding to the one or more virtual machines 104. In some embodiments, a backup policy indicates that file system data is to be backed up on a periodic basis (e.g., hourly, daily, weekly, monthly, etc.). In other embodiments, a backup policy indicates that file system data is to be backed up when a threshold size of data has changed. In other embodiments, a backup policy indicates that file system data is to be backed up upon a command from a user associated with primary system 102. The backup policy may indicate when a full backup snapshot is to be performed and when an incremental backup snapshot is to be performed. For example, the backup policy may indicate that a full backup snapshot is to be performed according to a first schedule (e.g., weekly, monthly, etc.) and an incremental backup snapshot is to be performed according to a second schedule (e.g., hourly, daily, weekly, etc.) The backup policy may indicate that a full backup snapshot is to be performed after a threshold number of incremental backup snapshots have been performed.

Secondary storage system 112 is a storage system configured to store file system data received from primary storage system 102. Secondary storage system 112 may protect a large volume of applications while supporting tight business requirements (recovery time objective (RTO) and recovery point objective (RPO)). Secondary storage system 112 may unify end-to-end protection infrastructure—including target storage, provide backup, replication of data, disaster recovery, and/or cloud tiering. Secondary storage system 112 may provide scale-out, globally deduped, highly available storage to consolidate all secondary data, including backups, files, and test/dev copies. Secondary storage system 112 simplifies backup infrastructure and eliminates the need to run separate backup software, proxies, media servers, and archival. Secondary storage system 112 may be fully integrated with a virtual machine (VM) centralized management tool, such as vCenter, and an applications programming interface (API) for data protection. Secondary storage system 112 may reduce the amount of time to perform RPOs and support instantaneous RTOs by creating a clone of a backup VM and running the VM directly from secondary storage system 112. Secondary storage system 112 may integrate natively with one or more cloud servers. Secondary storage system 112 may replicate data to a one or more cloud clusters to minimize potential data loss by replicating data as soon as a backup is completed. This allows data in the cloud to be used for disaster recovery, application migration, test/dev, or analytics.

Secondary storage system 112 may be comprised of one or more storage nodes 111, 113, 117. The one or more storage nodes may be one or more solid state drives, one or more hard disk drives, or a combination thereof. The file system data included in a backup snapshot may be stored in one or more of the storage nodes 111, 113, 117. In one embodiment, secondary storage system 112 is comprised of one solid state drive and three hard disk drives.

Secondary storage system 112 may include a file system manager 115. File system manager 115 is configured to organize the file system data in a tree data structure. An example of the tree data structure is a snapshot tree (e.g., Cohesity Snaptree), which may be based on a B+ tree structure (or other type of tree structure in other embodiments). The tree data structure provides a view of the file system data corresponding to a backup snapshot. The view of the file system data corresponding to the backup snapshot is comprised of a snapshot tree and a plurality of file metadata trees (e.g., blob structures). A file metadata tree may correspond to one of the files included in the backup snapshot. The file metadata tree is a snapshot structure that stores the metadata associated with the file. For example, a file metadata tree may correspond to a virtual machine container file (e.g., virtual machine image file, virtual machine disk file, etc.). Thus, the file metadata tree may store virtual machine file system metadata. The tree data structure may include one or more leaf nodes that store a data key-value pair. A user may request a particular value by providing a particular data key to file system manager 115, which traverses a view of a backup snapshot to find the value associated with the particular data key. A user may request a set of content files within a particular range of data keys of a snapshot. File system manager 115 may be configured to generate a view of file system data based on a backup snapshot received from primary system 102. File system manager 115 may be configured to perform one or more modifications, as disclosed herein, to a snapshot tree. The snapshot trees and file metadata trees may be stored in metadata store 114. The metadata store 114 may store the view of file system data corresponding to a backup snapshot. The metadata store may also store metadata associated with content files that are smaller than a limit size.

The tree data structure may be used to capture different versions of backup snapshots. The tree data structure allows a chain of snapshot trees corresponding to different versions of backup snapshots (i.e., different snapshot tree versions) to be linked together by allowing a node of a later version of a snapshot tree to reference a node of a previous version of a snapshot tree (e.g., a "snapshot tree forest"). For example, a root node or an intermediate node of the second snapshot tree corresponding to the second backup snapshot may reference an intermediate node or leaf node of the first snapshot tree corresponding to a first backup snapshot. The snapshot tree provides a view of the file system data corresponding to a backup snapshot.

A snapshot tree includes a root node, one or more levels of one or more intermediate nodes associated with the root node, and one or more leaf nodes associated with an intermediate node of the lowest intermediate level. The root node of a snapshot tree includes one or more pointers to one or more intermediate nodes. Each intermediate node includes one or more pointers to other nodes (e.g., a lower intermediate node or a leaf node). A leaf node may store file system metadata, an identifier of a data brick, a pointer to a file metadata tree (e.g., Blob structure), or a pointer to a data chunk stored on the secondary storage system. A leaf node may correspond to a data brick. The data brick may have a corresponding brick number.

Metadata associated with a file that is smaller than or equal to a limit size (e.g., 256 kB) may be stored in a leaf node of the snapshot tree. For example, a leaf node may store an inode. Metadata associated with a file that is larger than the limit size may be stored across the one or more storage nodes 111, 113, 117. A file metadata tree may be generated for the metadata associated with a file that is larger than the limit size. The file metadata tree is a snapshot structure and is configured to store the metadata associated with a file. The file may correspond to a virtual machine container file (e.g., virtual machine image file, virtual machine disk file, etc.). Thus, a file metadata tree may be used to represent an entire virtual machine.

The file metadata tree includes a root node, one or more levels of one or more intermediate nodes associated with the root node, and one or more leaf nodes associated with an intermediate node of the lowest intermediate level. A file metadata tree is similar to a snapshot tree, but a leaf node of a file metadata tree includes an identifier of a data brick storing one or more data chunks of the file or a pointer to the data brick storing one or more data chunks of the file. For example, a leaf node of a file metadata tree may include a pointer to or an identifier of a data brick storing one or more data chunks of a virtual machine container file. The location of the data brick may be identified using a table stored in a metadata store that matches brick numbers to a physical storage location or the location of the data brick may be identified based on the pointer to the data brick. The data of a file, such as a virtual machine container file, may be divided into a plurality of bricks. A leaf node of a file metadata tree may correspond to one of the plurality of bricks. A leaf node of the file metadata tree may include a pointer to a storage location for the brick. In some embodiments, the size of a brick is 256 kB.

A virtual machine container file is comprised of a plurality of virtual machine content files and metadata associated with the plurality of virtual machine content files. File system manager 115 may analyze the virtual machine container file to determine which portions of the virtual machine container file correspond to the plurality of virtual machine content files and which portions of the virtual machine container file correspond to the metadata associated with the plurality of virtual machine content files. File system manager 115 may further analyze the portions of the virtual machine container file corresponding to the metadata associated with the plurality of virtual machine content files to determine which portions of the virtual machine container file corresponding to the metadata associated with the plurality of virtual machine content files correspond to which virtual machine content file.

For example, file system manager 115 may analyze the virtual machine container file to determine a location of a file table. The virtual machine container file may store a file table that stores metadata associated with the plurality of virtual machine content files. A first entry of the file table may correspond to the metadata associated with a first virtual machine content file, a second entry of the file table may correspond to the metadata associated with a second virtual machine content file, and an nth entry of the file table may correspond to the metadata associated with an nth virtual machine content file. Each entry has an associated file offset range within the virtual machine container file. For example, a virtual machine container file may be 100 TB and store a plurality of files. The virtual machine container file may store a boot sector in a file offset range of 0-1 kB region of the virtual machine container file and the file table in a 1 kB-100 MB region of the virtual machine container file. The first entry of the file table may be stored in the file offset range of 1 kB-1.1 kB, the second entry of the file table may be stored in the file offset range of 1.1 kB-1.2 kB, and an nth entry of the file table may be stored in the file offset range of 99.9 MB-100 MB. File system manager 115 may generate a map that associates portions of the file table with their corresponding virtual machine content file.

File system manager 115 may traverse a snapshot tree to determine one or more nodes not shared by two virtual machine versions. A file metadata tree may correspond to a version of a virtual machine container file. The snapshot tree may include a first leaf node that includes a pointer to a file metadata tree corresponding to the first version of the virtual machine container file and a second leaf node that includes a pointer to a file metadata tree corresponding to the second version of the virtual machine container file. File system manager 115 may traverse the snapshot tree from a root node of the snapshot tree to the first leaf node and the second leaf node. File system manager 115 may traverse the file metadata tree corresponding to the first version of the virtual machine container file and the file metadata tree corresponding to the second version of the virtual machine container file to determine one or more leaf nodes that are not shared by the file metadata trees. In some embodiments, file system manager 115 traverses the file metadata tree corresponding to the second version of the virtual machine container file without traversing the file metadata tree corresponding to the first version of the virtual machine container file to determine one or more leaf nodes that are not shared by the file metadata trees. The nodes that are not shared by the two versions may be determined based on a view identifier associated with a node. For example, a node that has a view identifier associated with the second version of the virtual machine container file is not included in the first version of the virtual machine container file. A leaf node of a file metadata tree may include an identifier of or a pointer to a brick storing one or more data chunks associated with the virtual machine container file. The data brick storing one or more data chunks associated with the virtual machine container file may correspond to a virtual machine content file or metadata associated with a virtual machine content file. The data brick corresponds to a particular file offset within the virtual machine container file.

File system manager 115 may determine whether the file offset of the data brick corresponds to a portion of the virtual machine container file that stores a virtual machine content file or a portion of the virtual machine container file that stores metadata associated with the virtual machine content file. In the event the data brick corresponds to a portion of the virtual machine container file that stores the virtual machine content file, file system manager 115 may ignore the data brick and examine the next data brick. In the event the data brick corresponds to a portion of the virtual machine container file that stores metadata associated with the virtual machine content file, file system manager 115 may compare the file offset of the data brick to the file offsets included in the file table. The file offset may be used to determine which file has changed between virtual machine container file versions. For example, a data brick with a file offset range of 1 kB-1.1 kB stores metadata associated with a first virtual machine content file and indicates that the metadata associated with the first virtual machine content file has been modified. A data brick with a file offset range of 1.1 kB-1.2 kB stores metadata associated with a second virtual machine content file and indicates that the second virtual machine content file has been modified. A data brick with a file offset range of 99.9 MB-100 MB stores metadata associated with an nth virtual machine content file and indicates that the nth virtual machine content file has been modified.

File system manager 115 may manage a map that associates file offset ranges with virtual machine content files. The map may be stored in metadata store 114. A leaf node of a file metadata tree corresponding to a virtual machine container file may indicate a brick storing one or more data chunks of data associated with the virtual machine container file. The brick has a corresponding file offset and may be used by file system manager 115 to determine that the brick corresponds to metadata associated with a virtual machine content file. File system manager may compare the file offset corresponding to the brick to the file offset range associated with metadata associated with the plurality of virtual machine content files. In the event the file offset corresponding to the brick is included in a file offset range associated with metadata associated with a virtual machine content file, file system manager 115 may determine that the virtual machine content file corresponding to the file offset range has changed or been added between virtual machine versions. For example, a data brick with a file offset of 1.1 kB-1.2 kB indicates that a first virtual machine content file has been modified, a data brick with a file offset of 1.1 kB-1.2 kB indicates that a second virtual machine content file has been modified, and a data brick with a file offset of 99.9 MB-100 MB indicates that an nth virtual machine content file has been modified.

In other embodiments, for portions of the virtual machine container file that correspond to metadata associated with a virtual machine content file, file system manager 115 may read the metadata associated with a virtual machine content file. The metadata may store filename of a virtual machine content file and a timestamp that indicates that the virtual machine content file with which the metadata is associated, has changed. For example, the metadata may store a timestamp that indicates the virtual machine content file was modified after a last backup snapshot. The metadata associated with a virtual machine content file may be read and the virtual machine content file with which the metadata is associated, is determined to have changed.

Figure 2A:
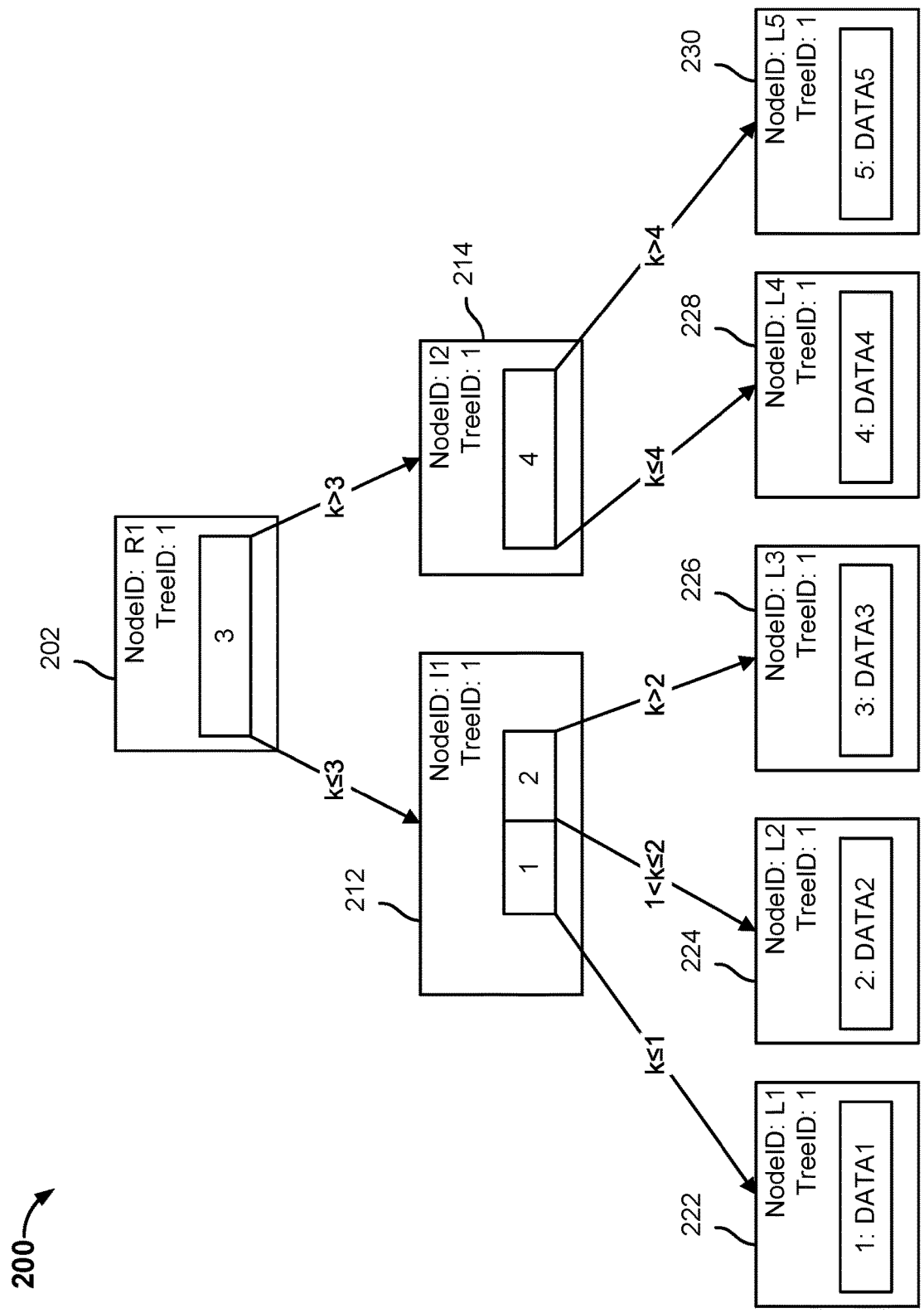
FIG. 2A is a block diagram illustrating an embodiment of a tree data structure.

FIG. 2A is a block diagram illustrating an embodiment of a tree data structure. A tree data structure may be used to represent the file system data that is stored on a secondary storage system, such as secondary storage system 112. The file system data may include metadata for a distributed file system and may include information, such as chunk identifier, chunk offset, file size, directory structure, file permissions, physical storage locations of the files, etc. A file system manager, such as file system manager 115, may generate tree data structure 200.

Tree data structure 200 is comprised of a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time t, for example at time to. The backup snapshot may be received from a primary system, such as primary system 102. The snapshot tree in conjunction with a plurality of file metadata trees may provide a complete view of the primary system associated with the backup snapshot for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node at the bottom of a snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick number of a data brick. A data brick may be comprised of one or more data blocks. In some embodiments, the leaf node is configured to store file system metadata (e.g., chunk identifier (e.g., hash value, SHA-1, etc.), file size, directory structure, file permissions, physical storage locations of the files, etc.). A leaf node may store a data key k and a pointer to a location that stores the value associated with the data key.

In other embodiments, a leaf node is configured to store the actual data when the metadata associated with a file is less than or equal to a limit size. For example, metadata associated with a file that is less than or equal to 256 kB may reside in the leaf node of a snapshot tree. In some embodiments, a leaf node includes a pointer to a file metadata tree (e.g., blob structure) when the size of metadata associated with a file is larger than the limit size. For example, a leaf node may include a pointer to a file metadata tree corresponding to a virtual machine container file.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2", and "3" are less than or equal to the node key "3." To find a leaf node storing a value associated with a data key of "4" or "5," the second branch of root node 202 would be traversed to intermediate node 214 because data keys "4" and "5" are greater than the node key of "3."

In some embodiments, a hash function may determine which branch of a node with which the non-numerical key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "3." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1", "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead the node with a data key of "5."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata associated with a file. In other embodiments, leaf node 222 is configured to store a pointer to a file metadata tree (e.g., blob structure). For example, the file metadata tree may correspond to a virtual machine container file.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata associated with a file. In other embodiments, leaf node 224 is configured to store a pointer to a file metadata tree (e.g., blob structure). For example, the file metadata tree may correspond to a virtual machine container file.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata associated with a file. In other embodiments, leaf node 226 is configured to store a pointer to a file metadata tree (e.g., blob structure). For example, the file metadata tree may correspond to a virtual machine container file.

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228. In some embodiments, leaf node 228 is configured to store metadata associated with a file. In other embodiments, leaf node 228 is configured to store a pointer to a file metadata tree (e.g., blob structure). For example, the file metadata tree may correspond to a virtual machine container file.

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230. In some embodiments, leaf node 230 is configured to store metadata associated with a file. In other embodiments, leaf node 230 is configured to store a pointer to a file metadata tree (e.g., blob structure). For example, the file metadata tree may correspond to a virtual machine container file.

Figure 2B:
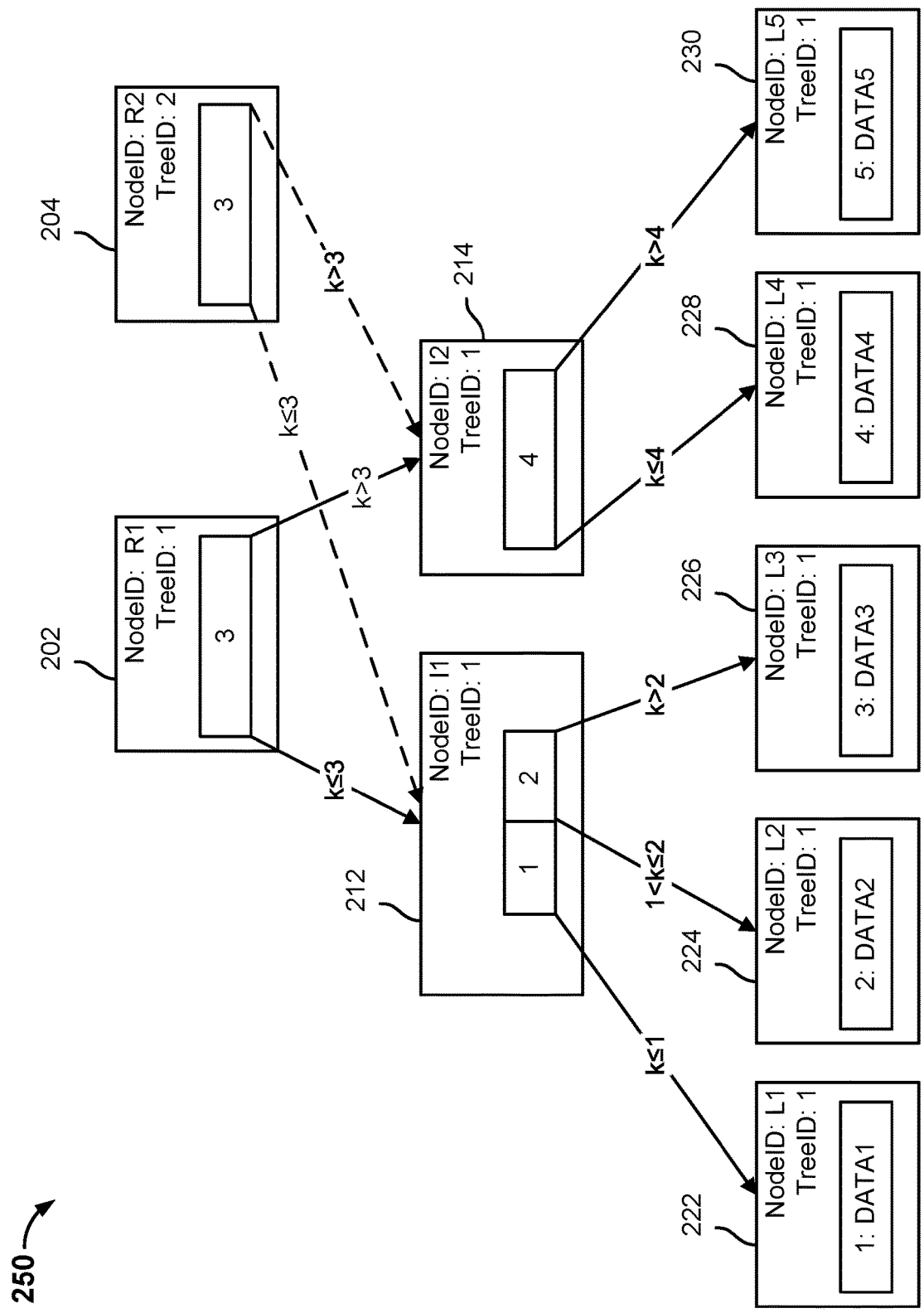
FIG. 2B is a block diagram illustrating an embodiment of a cloned snapshot tree.

FIG. 2B is a block diagram illustrating an embodiment of a cloned snapshot tree. A snapshot tree may be cloned when a snapshot tree is added to a tree data structure. In some embodiments, tree data structure 250 may be created by a storage system, such as secondary storage system 112. The file system data of a primary system, such as primary system 102, may be backed up to a secondary storage system, such as secondary storage system 112. A subsequent backup snapshot may correspond to a full backup snapshot or an incremental backup snapshot. The manner in which the file system data corresponding to the subsequent backup snapshot is stored in secondary storage system may be represented by a tree data structure. The tree data structure corresponding to the subsequent backup snapshot is created by cloning a snapshot tree associated with a last backup.

In the example shown, tree data structure 250 includes root nodes 202, 204, intermediate nodes 212, 214, and leaf nodes 222, 224, 226, 228, and 230. Tree data structure 250 may be a snapshot of file system data at a particular point in time t+n. The tree data structure can be used to capture different versions of file system data at different moments in time. The tree data structure may also efficiently locate desired metadata by traversing a particular version of a snapshot tree included in the tree data structure. In some embodiments, the tree data structure allows a chain of backup snapshot versions (i.e., snapshot trees) to be linked together by allowing a node of a later version of a snapshot tree to reference a node of a previous version of a snapshot tree. For example, a snapshot tree with root node 204 is linked to a snapshot tree with root node 202. Each time a snapshot is performed, a new root node may be created and the new root node includes the same set of pointers included in the previous root node, that is the new root node of the snapshot may be linked to one or more intermediate nodes associated with a previous snapshot. The new root node also includes a different NodeID and a different TreeID. The TreeID is the view identifier associated with a view of the primary system associated with the backup snapshot for the particular moment in time.

In some embodiments, a root node is associated with a current view of the file system data. A current view may still accept one or more changes to the data. The TreeID of a root node indicates a snapshot with which the root node is associated. For example, root node 202 with a TreeID of "1" is associated with a first backup snapshot and root node 204 with a TreeID of "2" is associated with a second backup snapshot. In the example shown, root node 204 is associated with a current view of the file system data.

In other embodiments, a root node is associated with a snapshot view of the file system data. A snapshot view may represent a state of the file system data at a particular moment in time in the past and is not updated. In the example shown, root node 202 is associated with a snapshot view of the file system data.

In the example shown, root node 204 is a copy of root node 202. Similar to root node 202, root node 204 includes the same pointers as root node 202. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "4" or "5." Root node 204 includes a NodeID of "R2" and a TreeID of "2." The NodeID identifies the name of the node. The TreeID identifies the backup snapshot with which the node is associated.

Figure 2C:
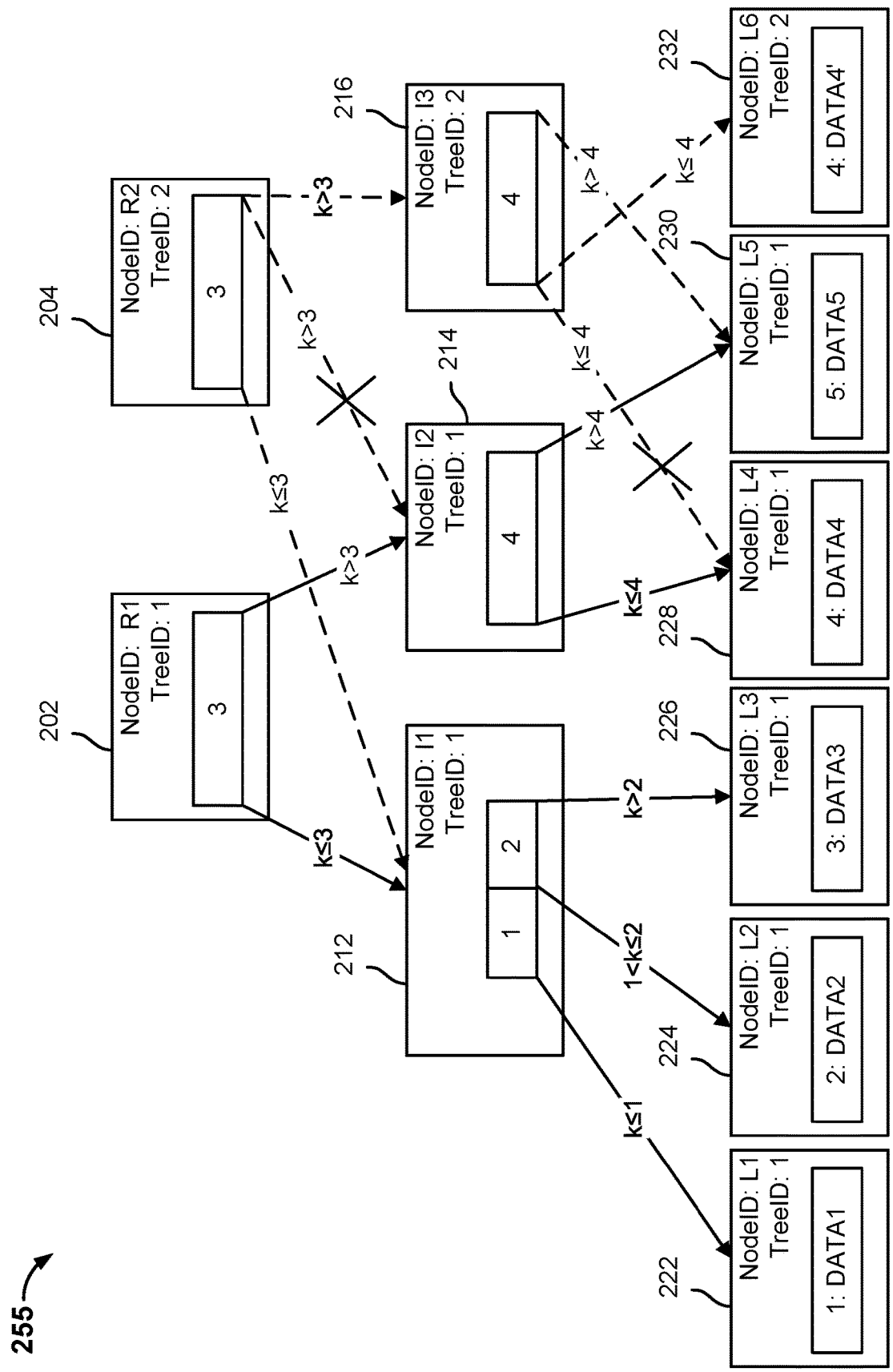
FIG. 2C is a block diagram illustrating an embodiment of modifying a snapshot tree.

FIG. 2C is a block diagram illustrating an embodiment of modifying a snapshot tree. In the example shown, tree data structure 255 may be modified by a file system manager, such as file system manager 115. A snapshot tree with a root node 204 may be a current view of the file system data at time t+n+m, for example, at time $t_2$. A current view represents a state of the file system data that is up-to-date and capable of receiving one or more modifications to the snapshot tree that correspond to modifications to the file system data. Because a snapshot represents a perspective of the file system data that is "frozen" in time, one or more copies of one or more nodes affected by a change to file system data, are made.

In the example shown, the value "DATA4" has been modified to be "DATA4'." In some embodiments, the value of a key value pair has been modified. For example, the value of "DATA4" may be a pointer to a file metadata tree corresponding to a first version of a virtual machine and the value of "DATA4'" may be a pointer to a file metadata tree corresponding to the second version of the virtual machine. In other embodiments, the value of the key pair is the data of metadata associated with a content file that is smaller than or equal to a limit size. In other embodiments, the value of the key value pair points to a different file metadata tree. The different file metadata tree may be a modified version of the file metadata tree that the leaf node previously pointed.

At $t_2$, the file system manager starts at root node 204 because that is the root node associated with snapshot tree at time $t_2$ (i.e., the root node associated with the last backup snapshot). The value "DATA4" is associated with the data key "4." The file system manager traverses snapshot tree 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

In some embodiments, leaf node 232 stores the value of a key value pair that has been modified. In other embodiments, leaf node 232 stores the modified data of metadata associated with a file that is smaller than or equal to a limit size. In other embodiments, leaf node 232 stores a pointer to a file metadata tree corresponding to a file, such as a virtual machine container file.

Figure 2D:
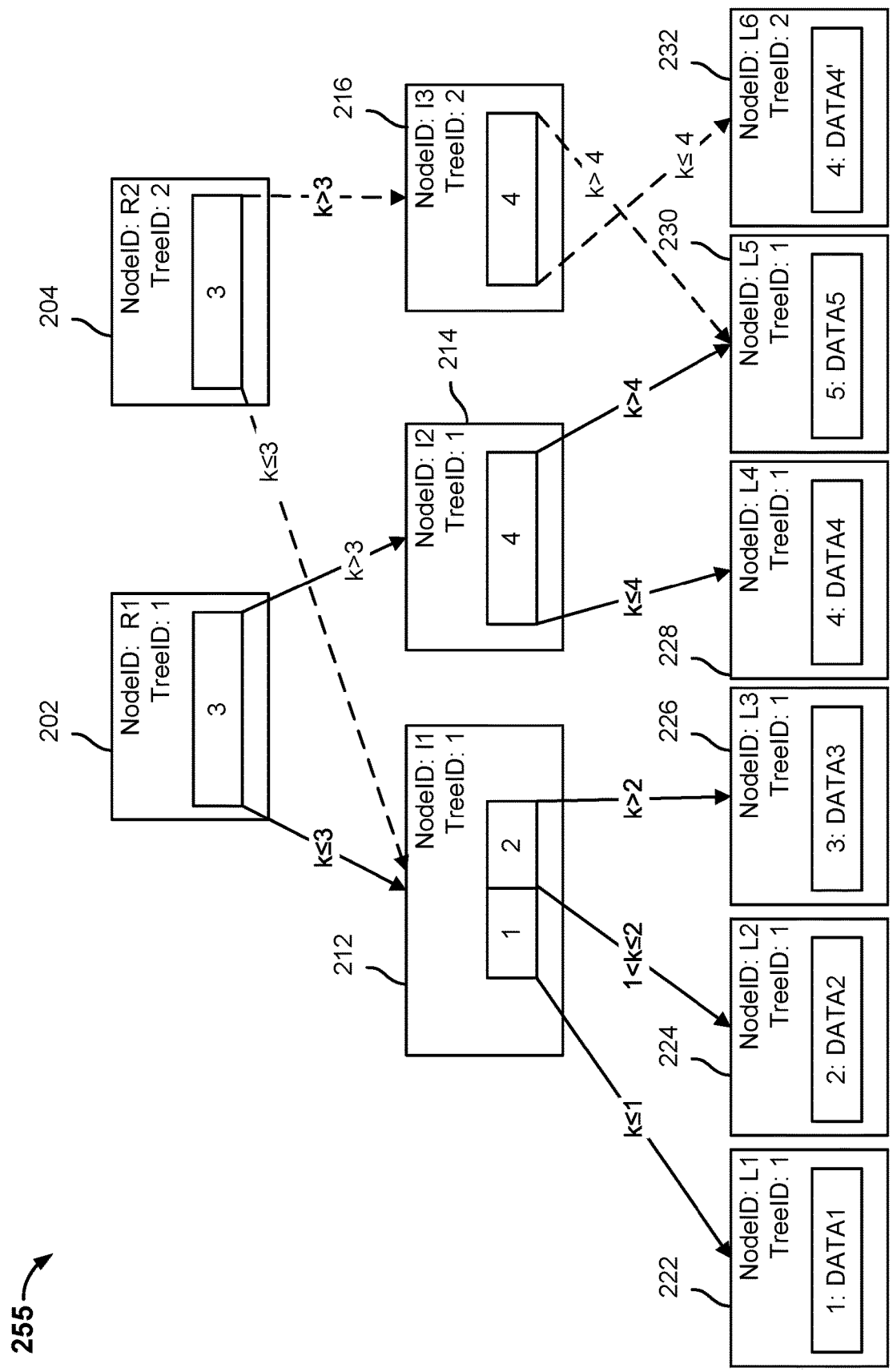
FIG. 2D is a block diagram illustrating an embodiment of a modified snapshot tree.

FIG. 2D is a block diagram illustrating an embodiment of a modified snapshot tree. Tree data structure 255 shown in FIG. 2D illustrates a result of the modifications made to a snapshot tree as described with respect to FIG. 2C.

Figure 3A:
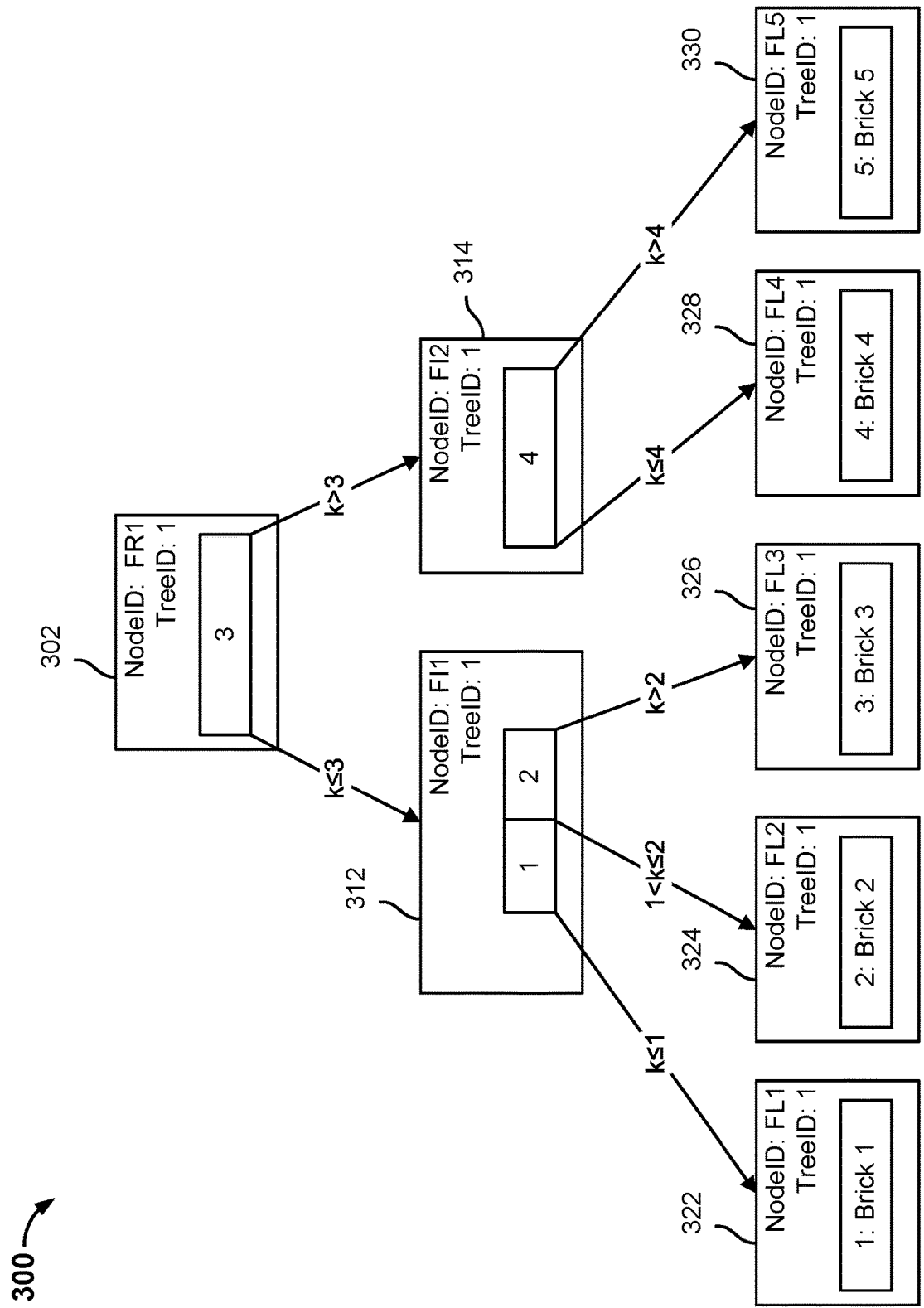
FIG. 3A is a block diagram illustrating an embodiment of a tree data structure.

FIG. 3A is a block diagram illustrating an embodiment of a tree data structure. In some embodiments, tree data structure 300 may be created by a storage system, such as secondary storage system 112. In the example shown, tree data structure 300 corresponds to a file and stores the metadata associated with the file. For example, tree data structure 300 may correspond to a virtual machine container file and may be used to store virtual machine file system metadata. The metadata associated with a file is stored by a storage system as a file separate from the file with which the metadata is associated, that is, the tree data structure is stored separately from a file. A leaf node of a snapshot tree associated with file system data, such as a leaf node of tree data structures 200, 250, 255, may include a pointer to a tree data structure corresponding to a file, such as tree data structure 300. A tree data structure corresponding to a file (i.e., a "file metadata tree") is a snapshot tree, but is used to organize the data blocks associated with a file that are stored on the secondary storage system. Tree data structure 300 may be referred to as a "metadata structure" or a "snapshot structure."

A tree data structure corresponding to a content file at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time to. A tree data structure associated with file system data may include one or more pointers to one or more tree data structures corresponding to one or more content files.

In the example shown, tree data structure 300 includes a file root node 302, file intermediate nodes 312, 314, and file leaf nodes 322, 324, 326, 328, 330. Although tree data structure 300 includes one intermediate level between root node 302 and leaf nodes 322, 324, 326, 328, 330, any number of intermediate levels may be implemented. Similar to the snapshot trees described above, each node includes a "NodeID" that identifies the node and a "TreeID" that identifies a snapshot/view with which the node is associated.

In the example shown, root node 302 includes a pointer to intermediate node 312 and a pointer to intermediate node 314. Root node 202 includes a NodeID of "FR1" and a TreeID of "1." The NodeID identifies the name of the node. The TreeID identifies the snapshot/view with which the node is associated.

In the example shown, intermediate node 312 includes a pointer to leaf node 322, a pointer to leaf node 324, and a pointer to leaf node 326. Intermediate node 312 includes a NodeID of "FI1" and a TreeID of "1." Intermediate node 312 includes a first node key and a second node key. The data key k for leaf node 322 is a value that is less than or equal to the first node key. The data key for leaf node 324 is a value that is greater than the first node key and less than or equal to the second node key. The data key for leaf node 326 is a value that is greater than the second node key. The pointer to leaf node 322 indicates that traversing tree data structure 300 from intermediate node 312 to leaf node 322 will lead to the node with a data key of "1." The pointer to leaf node 324 indicates that traversing tree data structure 300 from intermediate node 312 to leaf node 324 will lead to the node with a data key of "2." The pointer to leaf node 326 indicates that traversing tree data structure 300 from intermediate node 312 to leaf node 326 will lead to the node with a data key of "3."

In the example shown, intermediate node 314 includes a pointer to leaf node 328 and a pointer to leaf node 330. Intermediate node 314 includes a NodeID of "FI2" and a TreeID of "1." Intermediate node 314 includes a node key. The data key k for leaf node 328 is a value that is less than or equal to the node key. The data key for leaf node 330 is a value that is greater than the node key. The pointer to leaf node 328 indicates that traversing tree data structure 300 from intermediate node 314 to leaf node 328 will lead to the node with a data key of "4." The pointer to leaf node 330 indicates that traversing tree data structure 300 from intermediate node 314 to leaf node 330 will lead the node with a data key of "5."

Leaf node 322 includes a data key-value pair of "1: Brick 1." "Brick 1" is a brick identifier that identifies the data brick storing one or more data chunks associated with a content file corresponding to tree data structure 300. "Brick 1" may store one or more data chunks associated with a virtual machine content file or one or more data chunks of metadata associated with the virtual machine content file. Leaf node 322 includes NodeID of "FL1" and a TreeID of "1." To view the value associated with a data key of "1," tree data structure 300 is traversed from root node 302 to intermediate node 312 to leaf node 322.

Leaf node 324 includes a data key-value pair of "2: Brick 2." "Brick 2" is a brick identifier that identifies the data brick storing one or more data chunks associated with a content file corresponding to tree data structure 300. "Brick 2" may store one or more data chunks associated with a virtual machine content file or one or more data chunks of metadata associated with the virtual machine content file. Leaf node 324 includes NodeID of "FL2" and a TreeID of "1." To view the value associated with a data key of "2," tree data structure 300 is traversed from root node 302 to intermediate node 312 to leaf node 324.

Leaf node 326 includes a data key-value pair of "3: Brick 3." "Brick 3" is a brick identifier that identifies the data brick storing one or more data chunks associated with a content file corresponding to tree data structure 300. "Brick 3" may store one or more data chunks associated with a virtual machine content file or one or more data chunks of metadata associated with the virtual machine content file. Leaf node 326 includes NodeID of "FL3" and a TreeID of "1." To view the value associated with a data key of "3," tree data structure 300 is traversed from root node 302 to intermediate node 312 to leaf node 326.

Leaf node 328 includes a data key-value pair of "4: Brick 4." "Brick 4" is a brick identifier that identifies the data brick storing one or more data chunks associated with a content file corresponding to tree data structure 300. "Brick 4" may store one or more data chunks associated with a virtual machine content file or one or more data chunks of metadata associated with the virtual machine content file. Leaf node 328 includes NodeID of "FL4" and a TreeID of "1." To view the value associated with a data key of "4," tree data structure 300 is traversed from root node 302 to intermediate node 314 to leaf node 328.

Leaf node 330 includes a data key-value pair of "5: Brick 5." "Brick 5" is a brick identifier that identifies the data brick storing one or more data chunks associated with a content file corresponding to tree data structure 300. "Brick 5" may store one or more data chunks associated with a virtual machine content file or one or more data chunks of metadata associated with the virtual machine content file. Leaf node 330 includes NodeID of "FL5" and a TreeID of "1." To view the value associated with a data key of "5," tree data structure 300 is traversed from root node 302 to intermediate node 314 to leaf node 330.

A file, such as a virtual machine container file, may be comprised of a plurality of data chunks. A brick may store one or more data chunks. A virtual machine container file is comprised of a plurality of virtual machine content files and metadata associated with the plurality of content files. Some of the bricks of the file correspond to the plurality of virtual machine content files and some of the bricks of the file correspond to the metadata associated with the plurality of content files. In the example shown, leaf nodes 322, 324, 326, 328, 330 each store a corresponding brick identifier. A metadata store may include a data structure that matches a brick identifier with a corresponding location (physical location) of the one or more data chunks comprising the brick. In some embodiments, the data structure matches a brick identifier with a file offset corresponding to metadata and a virtual machine content file that corresponds to the file offset.

Figure 3B:
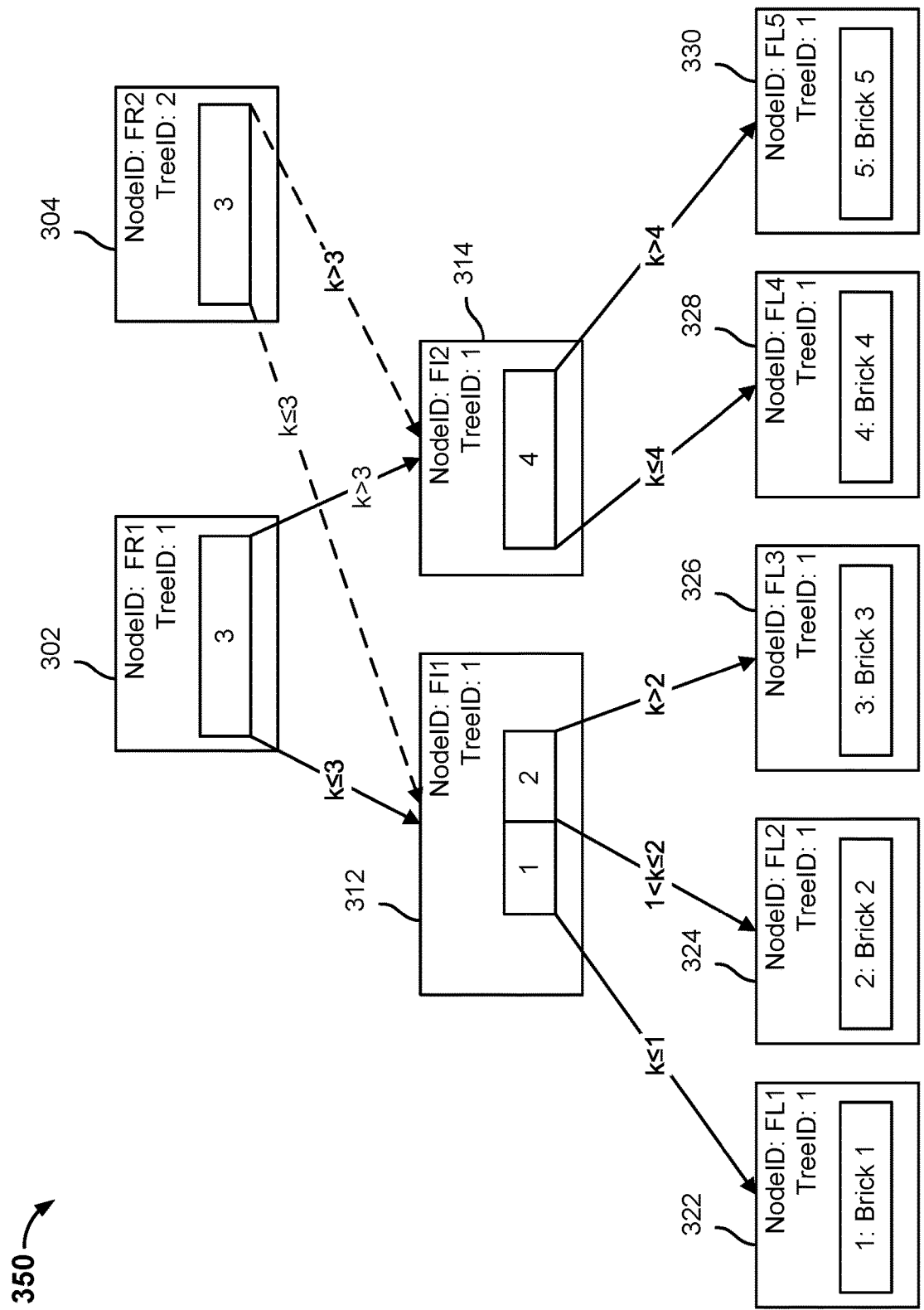
FIG. 3B is a block diagram illustrating an embodiment of adding a file metadata tree to a tree data structure.

FIG. 3B is a block diagram illustrating an embodiment of adding a file metadata tree to a tree data structure. In some embodiments, tree data structure 350 may be created by a storage system, such as secondary storage system 112. A tree data structure corresponding to a file, such as a virtual machine container file, is a snapshot tree, but stores metadata associated with the file (e.g., the metadata associated with the virtual machine container file). The tree data structure corresponding to a file can be used to capture different versions of the file at different moments in time. In some embodiments, the tree data structure allows a chain of file metadata trees corresponding to different versions of a file to be linked together by allowing a node of a later version of a file metadata tree to reference a node of a previous version of a file metadata tree. A file metadata tree is comprised of a root node, one or more levels of one or more intermediate nodes, and one or more leaf nodes.

A root node or an intermediate node of a version of a file metadata tree may reference an intermediate node or a leaf node of a previous version of a file metadata tree. Similar to the snapshot tree structure, the file metadata tree structure allows different versions of file data to share nodes and allows changes to a content file to be tracked. When a backup snapshot is received, a root node of the file metadata tree may be linked to one or more intermediate nodes associated with a previous file metadata tree. This may occur when the file is included in both backup snapshots.

In the example shown, tree data structure 350 includes a first file metadata tree comprising root node 302, intermediate nodes 312, 314, and leaf nodes 322, 324, 326, 328, and 330. Tree data structure 350 also includes a second file metadata tree that may be a snapshot of file data at a particular point in time t+n, for example at time $t_1$. The second file metadata tree is comprised of root node 304, intermediate nodes 312, 314, and leaf nodes 322, 324, 326, 328, and 330. The first file metadata tree may correspond to a first version of a virtual machine container file and the second file metadata tree may correspond to a second version of the virtual machine container file.

To create a snapshot of the file data at time t+n, a new root node is created. The new root node includes the same set of pointers as the original node. In the example shown, root node 304 includes a set of pointers to intermediate nodes 312, 314, which are intermediate nodes associated with a previous snapshot. The new root node also includes a different NodeID and a different TreeID. The TreeID is the view identifier associated with a view of the file metadata tree at a particular moment in time. In some embodiments, root node 304 is associated with a current view of the file data. The current view may represent a state of the file data that is up-to-date and is capable of receiving one or more modifications to the file metadata tree that correspond to modifications to the file data. The TreeID of a root node indicates a snapshot with which the root node is associated. For example, root node 302 with a TreeID of "1" is associated with a first backup snapshot and root node 304 with a TreeID of "2" is associated with a second backup snapshot. In other embodiments, root node 304 is associated with a snapshot view of the file data. A snapshot view may represent a state of the file data at a particular moment in time in the past and is not updated.

In the example shown, root node 304 is a copy of root node 302. Similar to root node 302, root node 304 includes the same pointers as root node 302. Root node 304 includes a first set of pointers to intermediate node 312. The first set of pointers associated with a data key (e.g., "1," "2," or "3") less than or equal the node key indicates that traversing a file metadata tree included in tree data structure 350 from root node 304 to intermediate node 312 will lead to a leaf node with a data key of "1," "2," or "3." Root node 304 includes a second set of pointers to intermediate node 314. The second set of pointers associated with a data key greater than the node key indicates that traversing a file metadata tree included in tree data structure 350 from root node 304 to intermediate node 314 will lead to a leaf node with a data key of "4" or "5." Root node 304 includes a NodeID of "FR2" and a TreeID of "2." The NodeID identifies the name of the node. The TreeID identifies the backup snapshot with which the node is associated.

Figure 3C:
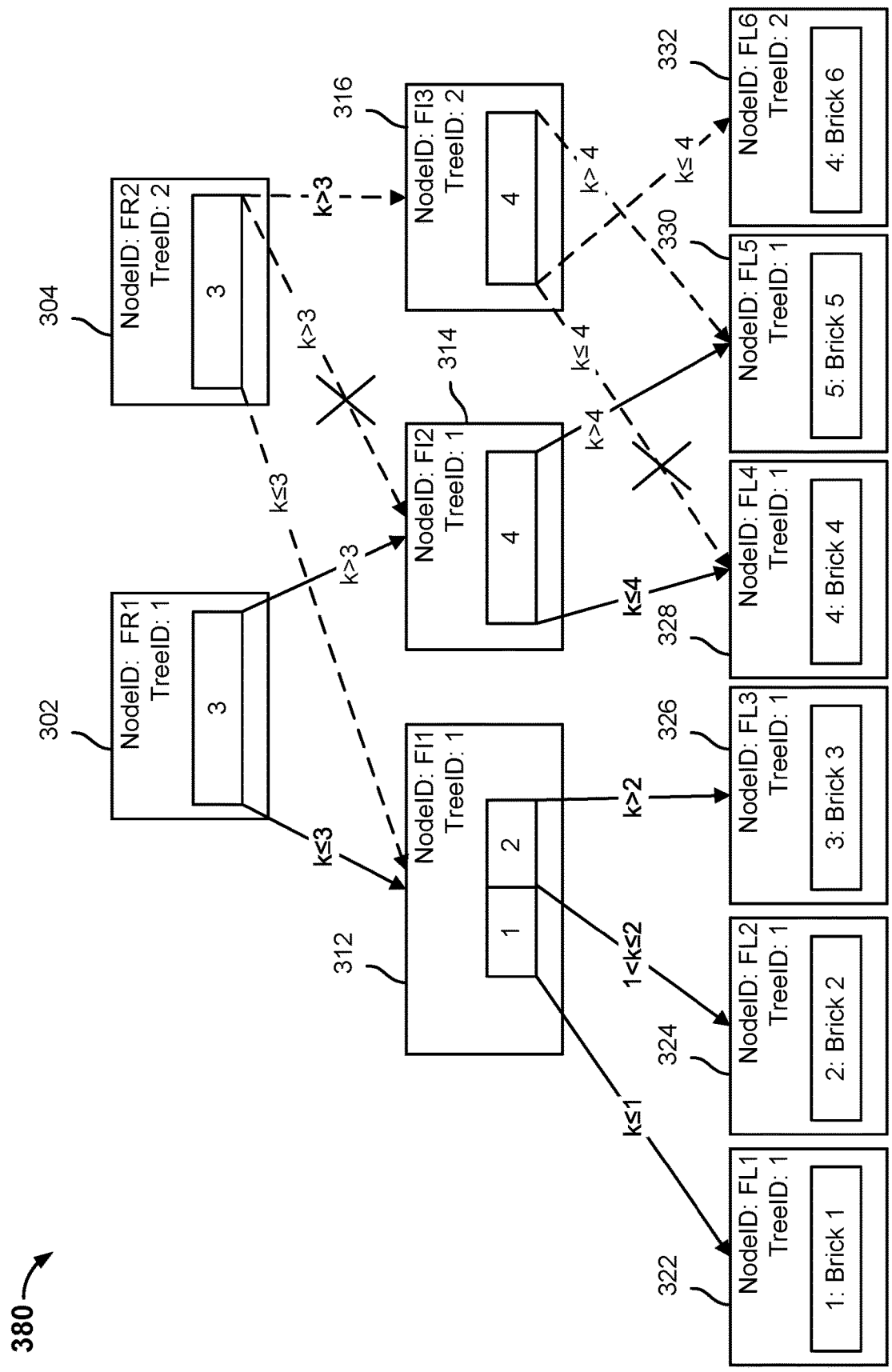
FIG. 3C is a block diagram illustrating an embodiment of modifying a file metadata tree of a tree data structure.

FIG. 3C is a block diagram illustrating an embodiment of modifying a file metadata tree of a tree data structure. In the example shown, tree data structure 380 may be modified by a file system manager, such as file system manager 115. A file metadata tree with root node 304 may be a current view of the file data at time t+n+m, for example, at time $t_2$. A current view may represent a state of the file data that is up-to-date and capable of receiving one or more modifications to the file metadata tree that correspond to modifications to the file system data. Because a snapshot represents a perspective of the file data that is "frozen" in time, one or more copies of one or more nodes affected by a change to file data, are made.

In some embodiments, the file data may be modified such that one of the data chunks is replaced by another data chunk. When a data chunk of file data associated with a previous backup snapshot is replaced with a new data chunk, the data brick storing the data chunk may be different. A leaf node of a file metadata tree stores a brick identifier associated with a particular brick storing the data chunk. To represent this modification to the file data, a corresponding modification is made to a current view of a file metadata tree. The current view of the file metadata tree is modified because the previous file metadata tree is a snapshot view and can no longer be modified. The data chunk of the file data that was replaced has a corresponding leaf node in the previous file metadata tree. A new leaf node in the current view of the file metadata tree is created, as described herein, that corresponds to the new data chunk. The new leaf node includes an identifier associated with the current view. The new leaf node may also store the chunk identifier associated with the modified data chunk.

In the example shown, a data chunk included in "Brick 4" has been modified. The data chunk included in "Brick 4" has been replaced with a data chunk included in "Brick 6." In some embodiments, the data chunk included in "Brick 6" includes a data chunk associated with a virtual machine content file. In other embodiments, the data chunk included in "Brick 6" includes a data chunk of metadata associated with a virtual machine content file. At $t_2$, the file system manager starts at root node 304 because that is the root node associated with the file metadata tree at time $t_2$. The value "Brick 4" is associated with the data key "4." The file system manager traverses tree data structure 380 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 380 from intermediate node 316 to leaf node 328, determines that the TreeID of leaf node 328 does not match the TreeID of root node 304, and creates a copy of leaf node 328. Leaf node 332 is a copy of leaf node 328, but stores the brick identifier "Brick 6" and includes the same TreeID as root node 304. The file system manager updates a pointer of intermediate node 316 to point to leaf node 332 instead of pointing to leaf node 328.

Figure 3D:
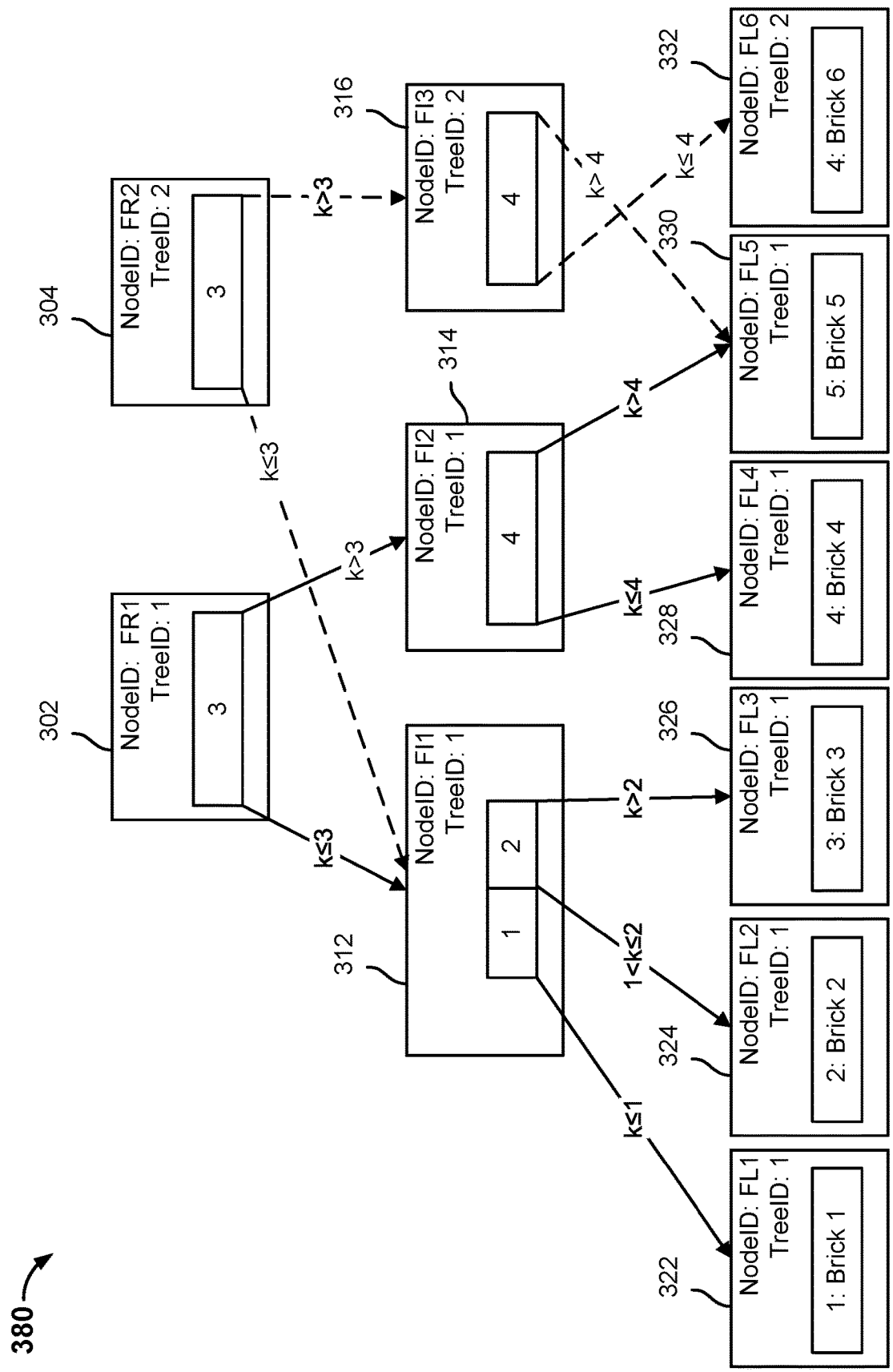
FIG. 3D is a block diagram illustrating an embodiment of a modified file metadata tree.

FIG. 3D is a block diagram illustrating an embodiment of a modified file metadata tree. The file metadata tree 380 shown in FIG. 3D illustrates a result of the modifications made to file metadata tree 380 as described with respect to FIG. 3C.

Figure 4:
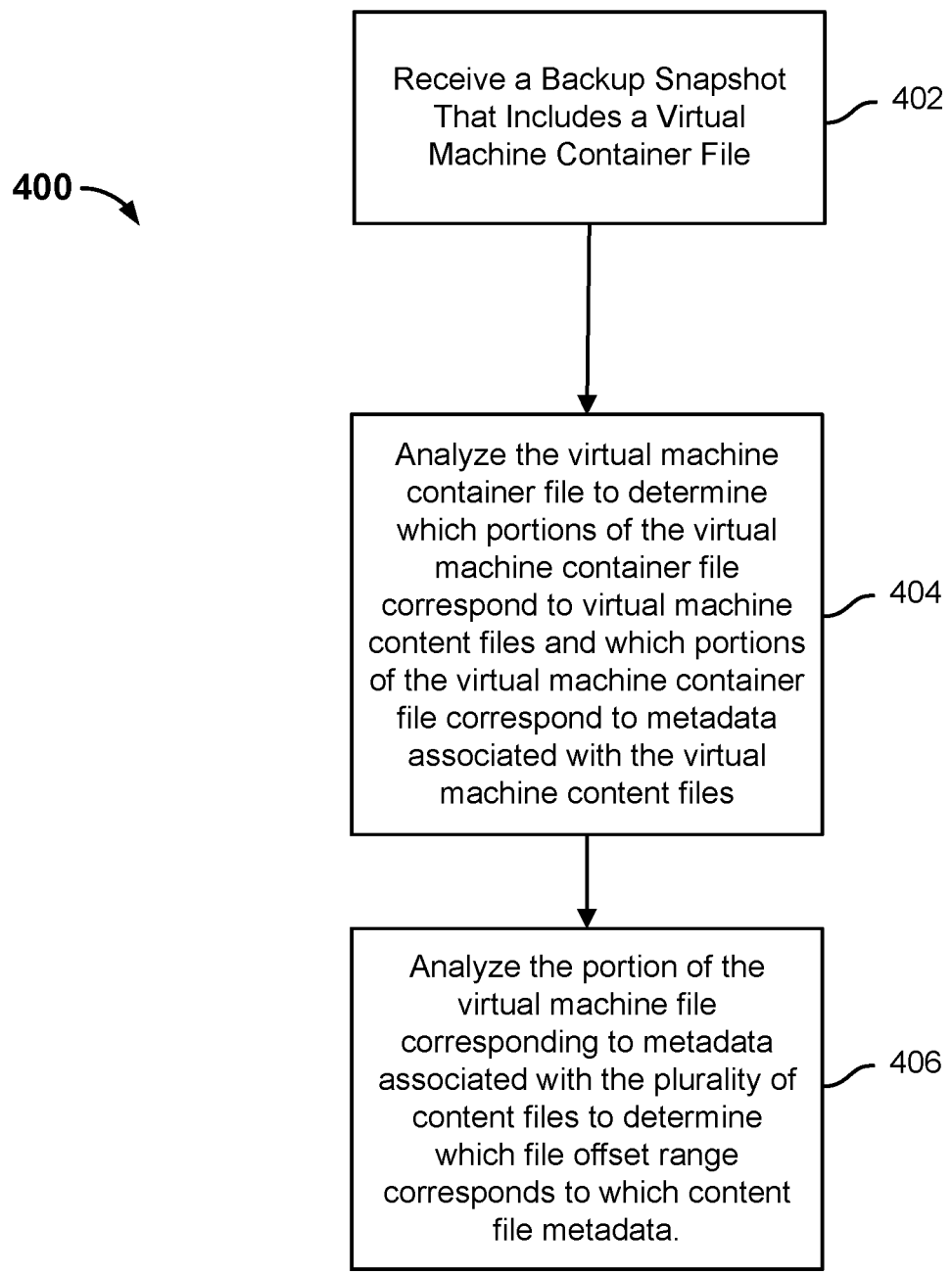
FIG. 4 is a flow chart illustrating an embodiment of a process for mapping portions of a virtual machine file to a plurality of virtual machine content files and metadata associated with the plurality of virtual machine content files.

FIG. 4 is a flow chart illustrating an embodiment of a process for mapping portions of a virtual machine container file to a plurality of virtual machine content files and metadata associated with the plurality of virtual machine content files. In the example shown, process 400 may be implemented by a storage system, such as secondary storage system 112.

At 402, a backup snapshot that includes a virtual machine container file is received. The backup snapshot is read and determined to include a virtual machine container file. The virtual machine container file includes a plurality of virtual machine content files of the virtual machine and metadata associated with the plurality of virtual machine content files. A primary system may perform a backup snapshot of the file system data according to a backup policy and send the backup snapshot to a secondary storage system. The virtual machine container file corresponds to a particular version of a virtual machine. Some of the virtual machine container file is used to store the plurality of virtual machine content files and some of the virtual machine container file is used to store the metadata associated with the virtual machine content files. Portions of the virtual machine container file may be accessed based on a file offset. When a backup snapshot that includes the virtual machine container file is received, the portions of the virtual machine container file that correspond to the plurality of virtual machine content files (e.g., file offsets) and the portions of the virtual machine container file that correspond to the metadata associated with the plurality of virtual machine content files is unknown.

At 404, the virtual machine container file is analyzed to determine which portions of the virtual machine container file correspond to virtual machine content files and which portions of the virtual machine container file correspond to metadata associated with the virtual machine content files, i.e., virtual machine file system metadata. The virtual machine container file is comprised of a plurality of data chunks. Some of the data chunks correspond to virtual machine content files and some of the data chunks correspond to metadata associated with the virtual machine content files. The virtual machine container file may be read to identify which portions of the virtual machine container file correspond to virtual machine content files and which portions of the virtual machine container file correspond to metadata associated with the virtual machine content files. In some embodiments, the virtual machine container file is read to identify which portions of the virtual machine container file correspond to metadata associated with the virtual machine content files without identifying which portions of the virtual machine container file correspond to virtual machine content files. The virtual machine container file may include a file table. The file table may store the metadata associated with the plurality of virtual machine content files. The file offset range of the virtual machine container file of the file table may be determined.

In some embodiments, the analysis result from determining which portion of the virtual machine content file corresponds to metadata associated with the plurality of virtual machine content files is utilized again. For example, the virtual machine file system metadata location/size may remain constant and be used again in another determination of virtual machine content file changes. That is, for another version of virtual machine container file, the portion of the virtual machine container file that corresponds to virtual machine file system metadata is known from 404, so the analysis result from 404 may be re-used to determine which files of the another version of the virtual machine container file have changed from a previous version.

In other embodiments, a later version of a virtual machine container file is reanalyzed to determine which portion of the virtual machine container file corresponds to the virtual machine file system metadata because a location and/or size of the virtual machine file system metadata portion may change from version to version.

At 406, the portion of the virtual machine container file corresponding to metadata associated with the plurality of virtual machine content files (the portion corresponding to virtual machine file system metadata) is analyzed to determine which file offset range corresponds to which content file metadata. For example, the file table may indicate file offset ranges of the virtual machine container file that correspond to metadata associated with a virtual machine content file. A virtual machine container file may be 100 TB and store a plurality of files. The virtual machine container file may store a boot sector in a file offset range of 0-1 kB region of the virtual machine container file and the file table in a 1 kB-100 MB region of the virtual machine container file. The first entry of the file table may be stored in the file offset range of 1 kB-1.1 kB, the second entry of the file table may be stored in the file offset range of 1.1 kB-1.2 kB, and an nth entry of the file table may be stored in the file offset range of 99.9 MB-100 MB. The first entry may correspond to metadata associated with a first virtual machine content file, the second entry may correspond to metadata associated with a second virtual machine content file, and the nth entry may correspond metadata associated with a nth virtual machine content file.

In some embodiments, a data structure is generated and stored. The data structure may include the virtual machine container file analysis information. For example, the data structure may include information that indicates a file offset range of the virtual machine container file that stores metadata associated with the plurality of virtual machine content files. The data structure may further associate file offset ranges of metadata associated with a virtual machine content file with its corresponding virtual machine content file. The data structure may be examined to determine which content files of the virtual machine have changed in a backup snapshot. For example, a data chunk with a file offset in the range 1 kB-1.1 kB may have changed. This file offset range corresponds to the metadata associated with a first virtual machine content file. Because the metadata associated with the first virtual machine content file has been modified, the first virtual machine content file is determined to have been modified.

Figure 5:
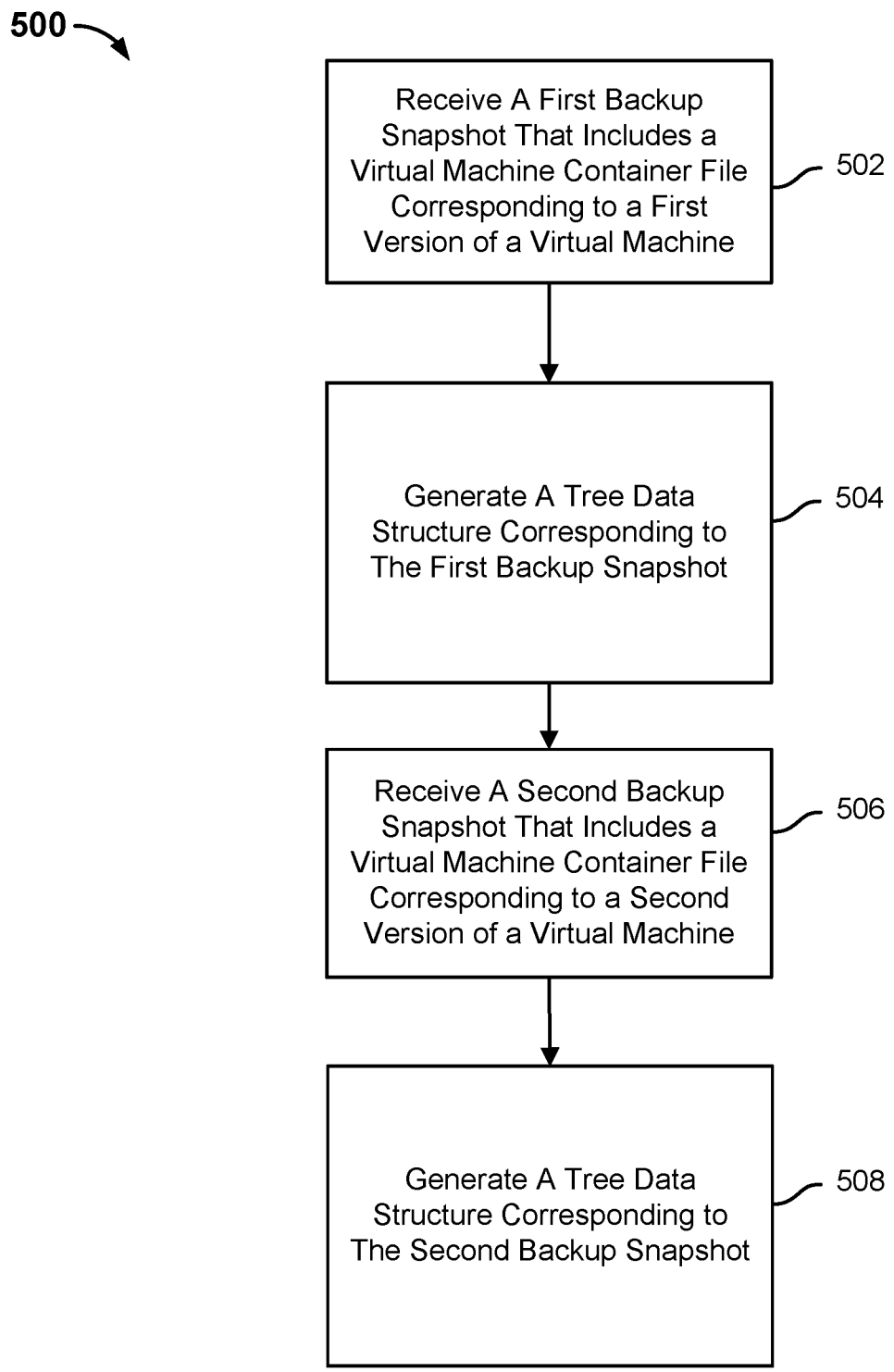
FIG. 5 is a flow chart illustrating an embodiment of a process of organizing file system data of a backup snapshot.

FIG. 5 is a flow chart illustrating an embodiment of a process of organizing file system data of a backup snapshot. In the example shown, process 500 may be implemented by a storage system, such as secondary storage system 112.

At 502, a first backup snapshot that includes a virtual machine container file corresponding to a first version of a virtual machine is received. The first backup snapshot includes file system data received from a primary system. The file system data includes one or more content files and metadata associated with the one or more content files. In some embodiments, one of the one or more content files is a virtual machine container file. The first backup snapshot may be full or incremental backup snapshot of the primary system.

At 504, a tree data structure corresponding to the first backup snapshot is generated. The tree data structure provides a view of the file system data corresponding to a backup snapshot. Regardless if the backup snapshot corresponds to a full or incremental backup snapshot, the tree data structure provides a complete view of the primary system for the moment at which the backup snapshot was performed.

The tree data structure is comprised of a snapshot tree and one or more file metadata trees. The snapshot tree includes a root node, one or more levels of one or more intermediate nodes, and one or more leaf nodes. The tree data structure may be traversed from the root node to any of the leaf nodes of the snapshot tree. A leaf node of the snapshot tree may include a pointer to a file metadata tree. A file metadata tree corresponds to a content file and stores the metadata associated with the content file, i.e., the virtual machine file system metadata. A content file may be a virtual machine container file. Thus, the file metadata tree may correspond to a virtual machine container file and store the metadata associated with the virtual machine container file. The file metadata tree corresponding to a virtual machine container file corresponds to a version of a virtual machine.

At 506, a second backup snapshot that includes a virtual machine container file corresponding to the second version of the virtual machine is received. The second backup snapshot includes file system data received from a primary system. The file system data includes one or more content files and metadata associated with the one or more content files. In some embodiments, one of the one or more content files is a virtual machine container file. The second backup snapshot may be full or incremental backup snapshot of the primary system. In the event the second backup snapshot corresponds to an incremental backup snapshot, the second backup snapshot includes the file system data of the primary system that was not included in the first backup snapshot. Some of the file system data corresponds to one or more new content files and metadata associated with the one or more new content files. Some of the file system data corresponds to data corresponding to the modified portions of the one or more content files included in a previous backup snapshot and the associated metadata.

In some embodiments, the file system data includes portions of a virtual machine container file that were not included in a previous backup snapshot. The portions of the virtual machine container file may include one or more new virtual machine content files and associated metadata. The portions of the virtual machine container file may include data corresponding to the modified portions of the one or more virtual machine content files included in a previous backup snapshot and metadata associated with the one or more modified virtual machine content files.

At 508, a tree data structure corresponding to the second backup snapshot is generated. The tree data structure provides a view of the file system data corresponding to a second backup snapshot. In the event the second backup snapshot corresponds to a full backup snapshot, a tree data structure, such as the tree data structure depicted in FIG. 2A may be generated. In the event the second backup snapshot corresponds to an incremental backup snapshot, a tree data structure corresponding to a previous backup snapshot may be used as a base tree data structure. For example, the tree data structure generated at 504 may be used as a base tree data structure. The base tree data structure may be modified in such as manner, for example, as depicted in FIGS. 2B-2D to reflect the changes. Portions of file system data that were added since a previous backup snapshot may be added to a tree data structure corresponding to the previous backup snapshot by cloning a root node of the previous backup snapshot, adding one or more intermediate nodes and one or more leaf nodes, and updating pointers in a manner as described above. Regardless if the second backup snapshot corresponds to a full or incremental backup snapshot, the tree data structure provides a complete view of the primary system for the moment at which the second backup snapshot was performed.

In some embodiments, the second backup snapshot includes a second version of the virtual machine container file. A file metadata tree corresponding to the virtual machine container file may be updated to reflect the updates. The file metadata tree corresponding to a previous version of the virtual machine container file may be used as a base tree data structure for the second version of the virtual machine container file. For example, the file metadata tree generated at 504 may be used as a base tree data structure. The new portions of the virtual machine container file may be added to the base tree data structure in a manner as described above with respect to FIGS. 3B-3D.

A leaf node of the snapshot tree that previously pointed to the file metadata tree corresponding to the previous version of the virtual machine container file may be updated (e.g., create a copy of the leaf node that points to a root node of the file metadata tree corresponding to the second version of the virtual machine container file) such that it includes a pointer to a root node of the file metadata tree corresponding to the second version of the virtual machine container file.

Using a tree data structure to organize file system data of a backup snapshot enables version differences between backup snapshots and version differences between content files (e.g., virtual machine container files) to be easily determined. The differences may be determined by traversing the tree data structures and the nodes that are not shared between the tree data structures correspond to the file system data differences between the two backup snapshots. In other embodiments, the tree data structure associated with the second backup snapshot and the nodes that are not shared by the two versions may be determined based on a view identifier associated with a node. For example, a node that has a view identifier associated with the second version of the virtual machine container file is not included in the first version of the virtual machine container file.

Figure 6:
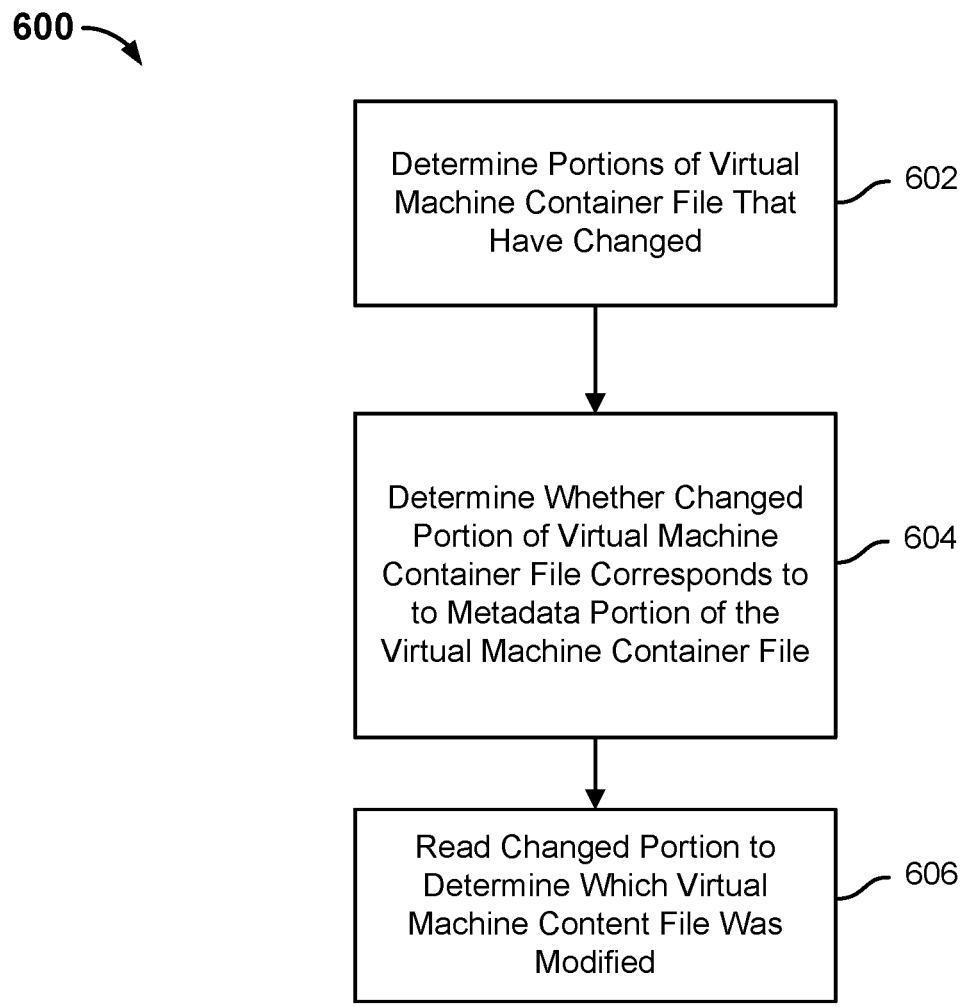
FIG. 6 is a flow chart illustrating an embodiment of a process of determining a modified content file of a virtual machine.

FIG. 6 is a flow chart illustrating an embodiment of a process of determining a modified content file of a virtual machine. In the example shown, process 600 may be implemented by a storage system, such as secondary storage system 112.

At 602, the portions of a virtual machine content file that have changed are determined. The portions of a virtual machine content file that have changed are determined by determining the differences between a first version of a virtual machine and a second version of a virtual machine are determined. The differences may be determined by traversing the snapshot trees corresponding to the first and second versions of the virtual machine content file and determining the portions of the file metadata trees corresponding to the virtual machine container file that are not shared. The differences may be determined by traversing a snapshot tree corresponding to a backup snapshot of file system data that includes the second version of the virtual machine. The snapshot tree corresponding to a backup snapshot of file system data that includes the second version of the virtual machine includes a root node, one or more levels of intermediate nodes, and a plurality of leaf nodes. A first leaf node of the plurality of leaf nodes includes a pointer to a file metadata tree corresponding to the first version of the virtual machine and a second leaf node of the plurality of leaf nodes includes a pointer to a file metadata tree corresponding to the second version of the virtual machine. The snapshot tree may be traversed from the root node to the first leaf node and to the second leaf node. The pointers included in the first and second leaf nodes may be followed to the file metadata trees corresponding to the first and second versions of the virtual machine.

A file metadata tree includes a root node, one or more levels of one or more intermediate nodes associated with the root node, and one or more leaf nodes associated with an intermediate node of the lowest intermediate level. A file metadata tree is similar to a snapshot tree, but a leaf node of a file metadata tree includes an identifier of a data brick storing one or more data chunks of the file or a pointer to the data brick storing one or more data chunks of the file. The file metadata tree corresponding to the first version of the virtual machine and the file metadata tree corresponding to the second version of the virtual machine share one or more leaf nodes and do not share one or more leaf nodes. In some embodiments, at least one of the leaf nodes that is not shared between the file metadata tree corresponding to the first version of the virtual machine and the file metadata tree corresponding to the second version of the virtual machine is included in the file metadata tree corresponding to the first version of the virtual machine, but is not included in the file metadata tree corresponding to the second version of the virtual machine. In other embodiments, at least one of the leaf nodes that is not shared between the file metadata tree corresponding to the first version of the virtual machine and the file metadata tree corresponding to the second version of the virtual machine is included in the file metadata tree corresponding to the second version of the virtual machine, but is not included in the file metadata tree corresponding to the first version of the virtual machine. The one or more leaf nodes that are included in the file metadata tree corresponding to the second version of the virtual machine, but are not included in the file metadata tree corresponding to the first version of the virtual machine are analyzed to determine one or more data bricks associated with the second version of the virtual machine that are not included in the first version of the virtual machine.

At 604, it is determined whether a changed portion of the virtual machine container file corresponds to a metadata portion of the virtual machine container file, i.e., the virtual machine file system metadata. A data brick of the one or more determined data bricks may correspond to a virtual machine content file or metadata associated with the virtual machine content file. A data brick has an associated file offset within the virtual machine container file. A data structure storing such information may be examined to determine whether the file offset of the data brick corresponds to a portion of the virtual machine container file storing virtual machine content files or a portion of the virtual machine container file storing metadata associated with the virtual machine content files. A data brick corresponds to the portion of the virtual machine container file storing metadata associated with the virtual machine content files in the event the data brick has a file offset that is within a file offset range associated with the metadata associated with the plurality of virtual machine content files (e.g., the data brick has a file offset associated with a master file table of the virtual machine container file). Whether a changed portion of the virtual machine container file corresponds to a metadata portion of the virtual machine container file may be determined by intersecting a file offset associated with a data brick with a file offset range associated with the metadata associated with the plurality of virtual machine content files. A changed portion corresponds to metadata associated with the plurality of virtual machine content files in the event the file offset associated with the data brick is within the file offset range associated with the metadata associated with the plurality of virtual machine content files.

At 606, a changed portion of the virtual machine container file is read to determine which virtual machine content file was modified. In some embodiments, the contents of the changed portion indicates that a virtual machine content file was modified. For example, the changed portion may correspond to metadata associated with a virtual machine content file. The metadata may store filename of a virtual machine content file and a timestamp that indicates that the virtual machine content file with which the metadata is associated, has changed. For example, the metadata may store a timestamp that indicates the virtual machine content file was modified after a last backup snapshot. The metadata associated with a virtual machine content file may be read and the virtual machine content file with which the metadata is associated, is determined to have changed.

In other embodiments, a virtual machine content file is determined to have been modified based on a file offset associated with one of the analyzed leaf nodes. The secondary storage system may manage a data structure (e.g., map) that associates file offset ranges with virtual machine content files. A leaf node may store a brick identifier or a pointer to a brick storing one or more data chunks associated with the virtual machine container file. A brick has a corresponding file offset and may be used to determine that the brick corresponds to metadata associated with a virtual machine content file. The file offset corresponding to the brick may compared to the file offset range associated with metadata associated with the plurality of virtual machine content files. In the event the file offset corresponding to the brick is included in a file offset range associated with metadata associated with a virtual machine content file, the virtual machine content file corresponding to the file offset range may be determined to have been modified or added between virtual machine versions. For example, a data brick with a file offset of 1.1 kB-1.2 kB corresponds to the metadata associated with a first virtual machine content file and indicates that the first virtual machine content file has been modified or added, a data brick with a file offset of 1.1 kB-1.2 kB corresponds to the metadata associated with a second virtual machine content file and indicates that second virtual machine content file has been modified or added, and a data brick with a file offset of 99.9 MB-100 MB corresponds to the metadata associated with an nth virtual machine content file and indicates that the nth virtual machine content file has been modified or added.

One or more virtual machine content files that have changed since a previous virtual machine backup may be quickly identified by intersecting the data bricks identified by traversing the snapshot tree with the portion of a master file table corresponding to modified files because the files in the master file table are small (e.g., 1 kB). The amount of time needed to read a file in the master file table pales in comparison to the amount of time needed to read all of the virtual machine metadata. The amount of time needed to read a subset of the master file table is proportional to the number of virtual machine content files that have changed since a last backup. For example, a 100 TB virtual machine container file may have 100 GB of metadata. Each virtual machine content file may have a corresponding metadata file in the master file table that is 1 kB in size. Traversing the snapshot trees may identify 10 files have changed since a last backup. The storage system may read 10 kB in data (10 files, each metadata file is 1 kB) to determine the one or more virtual machine content files that have changed since a pervious virtual machine backup instead of reading the 100 GB of metadata.

Determining which virtual machine content files are not shared between virtual machine versions using the techniques disclosed herein has several advantages. First, an index may be created that lists the one or more virtual machine content files associated with a virtual machine version. The amount of time needed to create the index is reduced because the one or more virtual machine content files that have been modified or added since a previous virtual machine version may be quickly identified using the tree data structure disclosed herein. The index associated with a previous version of the virtual machine may be quickly updated to include the one or more identified virtual machine content files. Second, a version of a virtual machine content file included within a virtual machine version may be determined. This may enable a user to recover a particular version of a virtual machine content file. Because a virtual machine container file includes a plurality of virtual machine content files, it is difficult and time consuming to determine the virtual machine content files included in the virtual machine container file and whether any of the virtual machine content files has changed since a previous version of the virtual machine container file. Third, a virus scan of a virtual machine may be performed a lot faster. For example, a first version of a virtual machine, i.e., the entire virtual machine content file may have been scanned. A second version of a virtual machine may also be scanned, but instead of scanning the entire contents of the second version of the virtual machine, the one or more virtual machine content files that have been modified or added since the first version of the virtual machine may be scanned. The one or more virtual machine content files may be identified using the techniques disclosed herein. Subsequently, a virus scanner may be applied to the portions of the virtual machine container file corresponding to the one or more identified virtual machine content files. Given the size of a virtual machine container file (e.g., 100 TB), the techniques disclosed herein significantly reduce the amount of time to perform a virus scan of the virtual machine container file. Fourth, the virtual machine container file may be analyzed to determine how much data has changed between virtual machine versions and which portions of the virtual machine container file have changed. This may allow a user of the virtual machine container file to determine which portions of the virtual machine are frequently used and/or critical to the operation of the virtual machine.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   generating a map that associates a virtual machine container file offset range of metadata with a corresponding virtual machine content file included in a virtual machine container file;
   determining one or more differences between a first version of the virtual machine container file and a second version of the virtual machine container file based on traversing a tree data structure corresponding to the first version of the virtual machine container file and a tree data structure corresponding to the second version of the virtual machine container file;

determining, based on one or more file offset ranges of metadata in the map corresponding to the one or more determined differences between the first version of the virtual machine container file and the second version of the virtual machine container file, one or more virtual machine content files in the second version of the virtual machine container file that have changed since the first version of the virtual machine container file, including by reading, at the one or more file offset ranges of metadata in the map corresponding to the one or more determined differences between the first version of the virtual machine container file and the second version of the virtual machine container file, metadata associated with the one or more virtual machine content files in the second version of the virtual machine container file that have changed since the first version of the virtual machine container file; and scanning the one or more virtual machine content files in the second version of the virtual machine content file that have changed since the first version of the virtual machine container file.

2. The method of claim 1, wherein generating the map includes analyzing the virtual machine container file to determine a location of a file table.

3. The method of claim 2, wherein the file table stores corresponding file offset ranges of the virtual machine container file for metadata associated with each virtual machine content file included in the virtual machine container file.

4. The method of claim 1, wherein traversing the tree data structure corresponding to the first version of the virtual machine container file and the tree data structure corresponding to the second version of the virtual machine container file determines one or more nodes that are not shared between the tree data structures.

5. The method of claim 4, further comprising determining that at least one of the one or more determined nodes is associated with the second version of the virtual machine container file.

6. The method of claim 5, wherein the at least one of the one or more determined nodes is associated with a corresponding file offset range of the second version of the virtual machine container file.

7. The method of claim 6, wherein the corresponding file offset range of the second version of the virtual machine container file corresponds to metadata associated with a first virtual machine content file included in the second version of the virtual machine container file.

8. The method of claim 7, further comprising reading the metadata associated with the first virtual machine content file in the corresponding file offset range of the second version of the virtual machine container file to determine that the first virtual machine content file corresponding the read file offset range has changed.

9. The method of claim 8, wherein the metadata associated with the first virtual machine content file includes at least a filename and a timestamp.

10. The method of claim 1, further comprising generating an index that identifies the one or more virtual machine content files included in the second version of the virtual machine container file.

11. The method of claim 1, wherein traversing the tree data structure corresponding to the first version of the virtual machine container file and the tree data structure corresponding to the second version of the virtual machine container file determines an amount of data that has changed between the first version of the virtual machine container file and the second version of the virtual machine container file.

12. A computer program product, the computer program product being embodied in a non-transitory computer readable storage medium and comprising computer instructions for:

generating a map that associates a virtual machine container file offset range of metadata with a corresponding virtual machine content file included in a virtual machine container file;

determining one or more differences between a first version of the virtual machine container file and a second version of the virtual machine container file based on traversing a tree data structure corresponding to the first version of the virtual machine container file and a tree data structure corresponding to the second version of the virtual machine container file;

determining, based on one or more file offset ranges of metadata in the map corresponding to the one or more determined differences between the first version of the virtual machine container file and the second version of the virtual machine container file, one or more virtual machine content files in the second version of the virtual machine container file that have changed since the first version of the virtual machine container file, including by reading, at the one or more file offset ranges of metadata in the map corresponding to the one or more determined differences between the first version of the virtual machine container file and the second version of the virtual machine container file, metadata associated with the one or more virtual machine content files in the second version of the virtual machine container file that have changed since the first version of the virtual machine container file; and scanning the one or more virtual machine content files.

13. The computer program product of claim 12, wherein traversing the tree data structure corresponding to the first version of the virtual machine container file and the tree data structure corresponding to the second version of the virtual machine container file determines one or more nodes that are not shared between the tree data structures.

14. The computer program product of claim 13, further comprising computer instructions for determining that at least one of the one or more determined nodes is associated with the second version of the virtual machine container file.

15. The computer program product of claim 14, wherein the at least one of the one or more determined nodes is associated with a corresponding file offset range of the second version of the virtual machine container file.

16. The computer program product of claim 15, wherein the corresponding file offset range of the second version of the virtual machine container file corresponds to metadata associated with a first virtual machine content file included in the second version of the virtual machine container file.

17. The computer program product of claim 16, further comprising computer instructions for reading the metadata associated with the first virtual machine content file in the corresponding file offset range of the second version of the virtual machine container file to determine that the first virtual machine content file corresponding the read file offset range has changed.

18. The computer program product of claim 17, wherein the metadata associated with the first virtual machine content file includes at least a filename and a timestamp.

19. The computer program product of claim 12, further comprising computer instructions for generating an index that identifies the one or more virtual machine content files included in the second version of the virtual machine content file.

20. A system, comprising:
a processor configured to:
generate a map that associates a virtual machine container file offset range of metadata with a corresponding virtual machine content file included in a virtual machine container file;
determine one or more differences between a first version of the virtual machine container file and a second version of the virtual machine container file based on traversing a tree data structure corresponding to the first version of the virtual machine container file and a tree data structure corresponding to the second version of the virtual machine container file;
determine, based on one or more file offset ranges of metadata in the map corresponding to the one or more determined differences between the first version of the virtual machine container file and the second version of the virtual machine container file, one or more virtual machine content files in the second version of the virtual machine container file that have changed since the first version of the virtual machine container file, including by reading, at the one or more file offset ranges of metadata in the map corresponding to the one or more determined differences between the first version of the virtual machine container file and the second version of the virtual machine container file, metadata associated with the one or more virtual machine content files in the second version of the virtual machine container file that have changed since the first version of the virtual machine container file; and
scan the one or more virtual machine content files; and
a memory coupled to the processor and configured to provide the processor with instructions.

* * * * *